United States Patent
Falk et al.

(10) Patent No.: US 7,639,180 B2
(45) Date of Patent: Dec. 29, 2009

(54) DYNAMIC MEMORY ALLOCATION AND SHARING IN ELECTRONIC SYSTEMS

(75) Inventors: Henry Falk, Long Beach, CA (US); Paul A. Underbrink, Lake Forest, CA (US)

(73) Assignee: SiRF Technology Inc., San Jose, CA (US)

( * ) Notice: Subject to any disclaimer, the term of this patent is extended or adjusted under 35 U.S.C. 154(b) by 544 days.

(21) Appl. No.: 10/762,852

(22) Filed: Jan. 22, 2004

(65) Prior Publication Data

US 2005/0050293 A1 Mar. 3, 2005

Related U.S. Application Data

(60) Provisional application No. 60/499,961, filed on Sep. 2, 2003.

(51) Int. Cl.
*G01S 1/00* (2006.01)
(52) U.S. Cl. .................... 342/357.12; 711/173
(58) Field of Classification Search ........................ None
See application file for complete search history.

(56) References Cited

U.S. PATENT DOCUMENTS

| | | | |
|---|---|---|---|
| 5,663,734 A | 9/1997 | Krasner |
| 5,663,735 A | 9/1997 | Eshenbach |
| 5,781,156 A | 7/1998 | Krasner |
| 5,812,087 A | 9/1998 | Krasner |
| 5,825,327 A | 10/1998 | Krasner |
| 5,831,574 A | 11/1998 | Krasner |
| 5,841,396 A | 11/1998 | Krasner |
| 5,874,914 A | 2/1999 | Krasner |
| 5,884,214 A | 3/1999 | Krasner |
| 5,945,944 A | 8/1999 | Krasner |
| 5,999,124 A | 12/1999 | Sheynblat |
| 6,002,363 A | 12/1999 | Krasner |
| 6,016,119 A | 1/2000 | Krasner |
| 6,041,379 A | 3/2000 | Sher |
| 6,052,081 A | 4/2000 | Krasner |
| 6,061,018 A | 5/2000 | Sheynblat |
| 6,064,336 A | 5/2000 | Krasner |
| 6,104,338 A | 8/2000 | Krasner |
| 6,104,340 A | 8/2000 | Krasner |
| 6,107,960 A | 8/2000 | Krasner |
| 6,111,540 A | 8/2000 | Krasner |

(Continued)

OTHER PUBLICATIONS

Marketing Material: Qualcomm CDMA Technologies — Integrated Solutions — MGP6200™ Multimode GPS Processor (8 pages) 2002.

(Continued)

*Primary Examiner*—Sanjiv Shah
*Assistant Examiner*—Duc T Doan
(74) *Attorney, Agent, or Firm*—RatnerPrestia

(57) ABSTRACT

A method and system for dynamic memory allocation and sharing in electronic systems. Embodiments include multi-channel signal processing, including continuously receiving multiple channels, wherein each channel comprises a discrete signal, and processing the multiple channels in a signal processing component on a time-multiplexed basis. Processing the multiple channels includes configuring the signal processing component for one of a plurality of operational modes, including allocating a memory into areas for storage of types of data, wherein certain areas are accessed by certain signal processing subsystems in certain manners. Configuring includes configuring the signal processing component to operate in different modes concurrently for different channels.

52 Claims, 16 Drawing Sheets

U.S. PATENT DOCUMENTS

| | | | |
|---|---|---|---|
| 6,131,067 A | 10/2000 | Girerd | |
| 6,133,871 A | 10/2000 | Krasner | |
| 6,133,873 A | 10/2000 | Krasner | |
| 6,133,874 A | 10/2000 | Krasner | |
| 6,150,980 A | 11/2000 | Krasner | |
| 6,185,427 B1 | 2/2001 | Krasner | |
| 6,208,290 B1 | 3/2001 | Krasner | |
| 6,208,291 B1 | 3/2001 | Krasner | |
| 6,215,441 B1 | 4/2001 | Moeglein | |
| 6,215,442 B1 | 4/2001 | Sheynblat | |
| 6,236,354 B1 | 5/2001 | Krasner | |
| 6,239,742 B1 | 5/2001 | Krasner | |
| 6,259,399 B1 | 7/2001 | Krasner | |
| 6,272,430 B1 | 8/2001 | Krasner | |
| 6,289,041 B1 | 9/2001 | Krasner | |
| 6,307,504 B1 | 10/2001 | Sheynblat | |
| 6,313,786 B1 | 11/2001 | Sheynblat | |
| 6,314,308 B1 | 11/2001 | Sheynblat | |
| 6,377,209 B1 | 4/2002 | Krasner | |
| 6,408,196 B2 | 6/2002 | Sheynblat | |
| 6,411,254 B1 | 6/2002 | Moeglein | |
| 6,411,892 B1 | 6/2002 | Van Diggelen | |
| 6,417,801 B1 | 7/2002 | Van Diggelen | |
| 6,421,002 B2 | 7/2002 | Krasner | |
| 6,429,814 B1 | 8/2002 | Van Diggelen et al. | |
| 6,433,731 B1 | 8/2002 | Sheynblat et al. | |
| 6,453,237 B1 | 9/2002 | Fuchs et al. | |
| 6,484,097 B2 | 11/2002 | Fuchs et al. | |
| 6,487,499 B1 | 11/2002 | Fuchs et al. | |
| 6,510,387 B2 | 1/2003 | Fuchs et al. | |
| 6,542,821 B2 | 4/2003 | Krasner | |
| 6,583,757 B2 | 6/2003 | Krasner | |
| 6,597,311 B2 | 7/2003 | Sheynblat | |
| 6,778,135 B2 | 8/2004 | Warloe et al. | |
| 2003/0046492 A1* | 3/2003 | Gschwind et al. | 711/118 |
| 2003/0088741 A1 | 5/2003 | Peng et al. | |
| 2003/0134646 A1* | 7/2003 | Forrester | 455/456 |
| 2003/0147457 A1* | 8/2003 | King et al. | 375/148 |

OTHER PUBLICATIONS

Marketing Material/White Paper: SnapTrack: A Qualcomm Company — SnapTrack's Wireless Assisted GPS™ (A-GPS) Solution Provides the Industry's Best Location System—Location Technologies for GSM, GPRS and WCDMA Networks (Qualcomm CDMA Technologies: Enabling the Future of Communications) (4 pages) 2003.

Novel Fast GPS/GLONASS Code Acquisition Technique Using Low Update Rate FFT, Electronic Letters, vol. 28 No. 9, pp. 863-865 (3 pages) Apr. 23, 1992.

* cited by examiner

COARSE ACQUISITION

HOT START

DYNAMIC MEMORY ALLOCATION AND SHARING IN ELECTRONIC SYSTEMS

RELATED APPLICATION

This application claims priority from U.S. Provisional Patent Application No. 60/499,961, filed Sep. 2, 2003, which is incorporated by reference herein in its entirety.

TECHNICAL FIELD

The disclosed embodiments relate to dynamic memory partitioning and sharing in electronic systems.

BACKGROUND

Portable electronic processor-based devices with diverse capabilities have become very popular around the world. As the popularity of portable electronic devices has increased, so too has consumer dependence on these devices. Consumers now rely on portable electronic devices, such as personal computers, personal digital assistants (PDAs), cellular telephones, and satellite-based positioning system devices, for everything from remote Internet access to communication. Increasingly, consumers demand varied data and voice capabilities in one relatively small device. Manufacturers have responded by producing handheld devices with multiple data, voice and satellite-based positioning capabilities.

An example of a device that performs several functions or applications is a cellular phone that can send and receive email, send and receive text messages, and locate itself using satellite-based positioning technology. Personal digital assistants (PDAs) also provide increasingly varied applications to users. Each application requires processing power and memory, some of which may be resident on the device, and some of which may be remotely hosted. Various manufacturers typically produce components and software to perform specific functions on a device. These various components and associated software for various functions are typically inserted in a larger system and must communicate and cooperate so as to efficiently use available resources on the device, including processor cycles and memory.

Even though semiconductor manufacturing technology has progressed to produce greater capability in ever smaller packages, there is always a demand for more processing power and memory, especially on small devices. For example, if memory is not used efficiently, it may be necessary to provide more physical memory, which increases both the size and the cost of the device. It is therefore desirable for the specifically designed hardware and software to be configurable so as to flexibly allocate scarce resources, such as memory, when inserted in the larger system of the device. Memory is a particularly important resource in systems that process large amounts of data, such as signal processing intensive systems. An example of a signal processing system whose performance is typically in direct proportion to the amount of memory available is a satellite-based positioning system. Commonly, the speed and efficiency of the satellite-based positioning system is limited by the amount of memory it is able to use. It is therefore desirable to have efficient memory usage in systems, such as signal processing systems, that are to be integrated into larger systems.

SUMMARY

Systems consistent with the present invention provide an approach to receiving satellite data in an electronic system, where the electronic system may have a central processing unit (CPU) and a signal processing system that may be configurable to process satellite signals in a satellite-based positioning system and is in signal communication with the CPU. The signal processing system may have a plurality of subsystems, including an input sample subsystem and at least one other subsystem, where the input sample subsystem may be able receive satellite data and produce input data samples, and where at least one other subsystem may be a signal processing subsystem that produces coherent data, and a fast Fourier transform (FFT) subsystem that processes the coherent data and produces noncoherent data. The signal processing system may also include a memory device configurable into a number of configurations dependent upon an operational mode of the signal processing system, where the memory device is configurable into regions with each region storing a type of data, and each region is accessed by at least one of the other subsystems, and wherein at least one of the regions stores data words from the CPU that determine the configuration of the memory device.

Other systems, methods, features, and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

Embodiments of the invention are described with the aid of the drawings, which are not intended to be limiting. In the drawings, similar reference numbers identify similar elements or acts.

DETAILED DESCRIPTION

Figure 1:
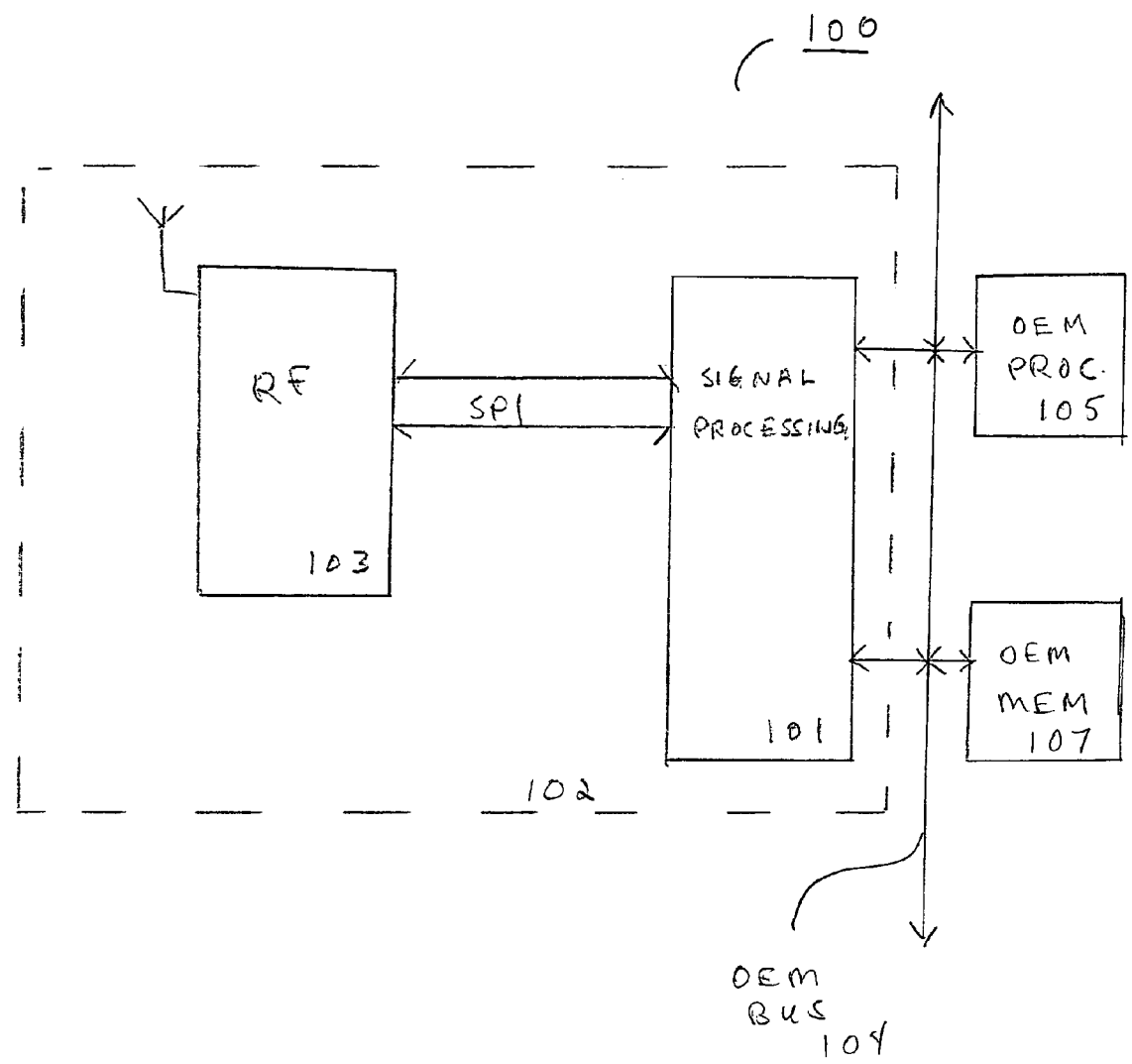
FIG. 1 is a block diagram of an embodiment of a system including a signal processing system.

A system and method for dynamic memory allocation and sharing is described. Embodiments include allocating random access memory (RAM) to various regions that have varying sizes, are accessed by particular subsystems, and store particular types of data. The RAM allocation varies with operational modes of a data processing system, such as a signal processing system. Once the available memory is allocated, the different regions are shared by different subsystems which may be operating in different modes concurrently.

Various embodiments are illustrated in a signal processing system, in particular a global positioning system (GPS). The embodiments are not limited to such a system, and are useful in any electronic system in which memory is a limited resource that must be allocated and reallocated on an ongoing basis to multiple subsystems. Illustrative examples of embodiments include a signal processing core that processes radio frequency (RF) signals received from satellite vehicles (SVs) in separate channels. The signal processing core operates in several different modes depending on multiple factors, such as how much information the GPS system initially has regarding visible satellites. Available memory is advantageously allocated for most efficient use in a particular operational mode. In addition, available memory is advantageously allocated on a channel-by-channel basis. The term channel is used to indicate a particular usage of hardware resources. A channel can correspond to one or more received signals from one or more particular satellites. Different channels are allocated available memory for use in different modes concurrently. The word channel as used herein can also indicate any discrete signal or data stream that provides a discrete signal to be processed by a signal processing system.

The embodiments described include methods for multichannel signal processing, including continuously receiving multiple channels, processing the multiple channels in a signal processing component on a time-multiplexed basis, and configuring the signal processing component for one of a plurality of operational modes, including allocating a memory into areas for storage of types of data. Certain areas are accessed by certain signal processing subsystems in certain manners, and the signal processing component is configured to operate in different modes concurrently for different channels. The signal processing component is continuously reconfigured based on evaluation of output of the signal processing component. The memory is further allocated to include a channel region in which data words are stored by software. The software is executed by a controlling processor. The controlling processor and the software can reside anywhere. The data words include all of the information necessary to configure the signal processing subsystem, including the memory. The data words are read by various subsystems and are also updated by various subsystems, for example by storing address pointers that indicate where a particular subsystem has accessed a memory region, and by storing status information.

In the following description, numerous specific details are introduced to provide a thorough understanding of, and enabling description for, embodiments of the memory allocation and sharing. One skilled in the relevant art, however, will recognize that the dynamic memory allocation and sharing can be practiced without one or more of the specific details, or with other components, systems, etc. For example, instances of particular memory sizes are given for illustration, but other sizes are possible using the same principles described. In addition, various structures and functions are shown in particular arrangements, but are not intended to be limiting. For example, memory structures may reside on one chip or be distributed in any fashion, to include some memory being remotely accessed. In other instances, well-known structures or operations are not shown, or are not described in detail, to avoid obscuring aspects of the dynamic memory allocation and sharing.

FIG. 1 is a block diagram of an embodiment of a system 100, including a signal processing system 102. The signal processing system 102 includes radio frequency ("RF") components and digital signal processing components. An RF component 103 receives RF signals, in one embodiment from GPS satellites, or satellite vehicles (SVs). The RF signals are digitized and transmitted to a digital signal processing component 101. In one embodiment, the RF component 103 and the digital signal processing component 101 communicate via a serial peripheral interface (SPI). The digital signal processing component 101 processes the RF signals, as will be described further below, and transmits processed data to an OEM processor 105 via an OEM bus 104. The digital signal processing component 101 also communicates with an OEM memory 107. As described further below, the digital signal processing component 101 includes memory for signal processing functions. Embodiments of the invention are particularly advantageous in systems that have a limited amount of memory, including memory on the digital signal processing component 101 and the OEM memory 107. Typically, memory is limited in systems, but this is particularly true of systems in handheld or mobile devices.

Optionally, the OEM memory 107 is not required to be accessed by the digital signal processing component 101. Other possible arrangements include all of the RF component 103 functionality and the digital signal processing component 101 functionality located on one component, or chip, including all of the required memory and processing power to perform signal processing functions. The system 100 is capable of operating effectively without GPS aiding information, or alternatively, it may operate with GPS aiding information from a variety of sources.

Figure 2:
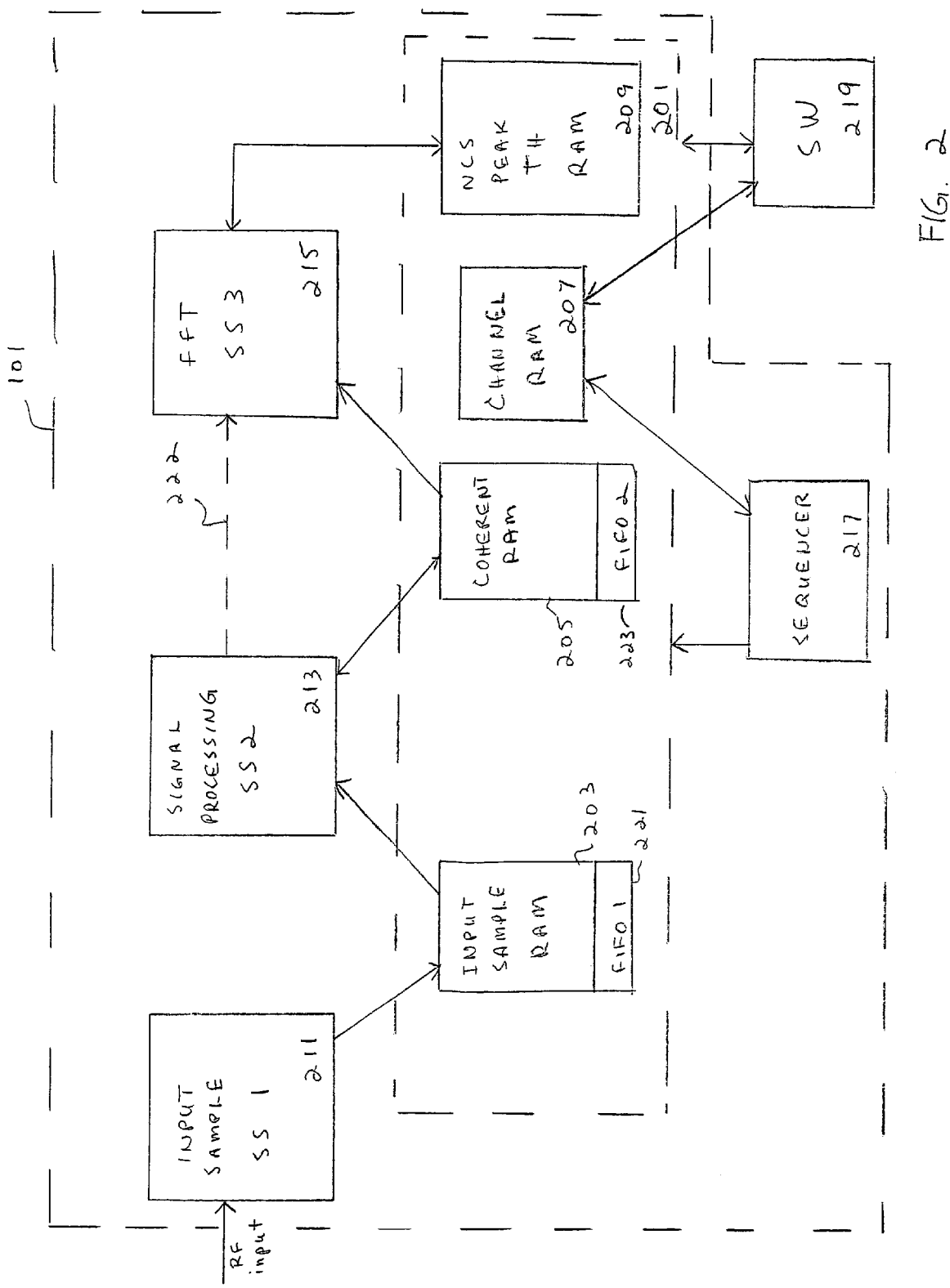
FIG. 2 is a block diagram showing subsystems of one embodiment of a signal processing component.

FIG. 2 is a block diagram showing subsystems of one embodiment of a digital signal processing component 101, including an input sample subsystem (SS1) 211, a signal processing subsystem (SS2) 213, and a fast fourier transform (FFT) subsystem (SS3) 215. The digital signal processing component 101 further includes a memory subsystem 201, which in one embodiment includes random access memory (RAM) that is dynamically allocated and shared between various subsystems as described further below. The memory subsystem 201 can be a single memory component or device, or multiple memory components. The memory subsystem 201 includes an input sample RAM 203, a coherent data RAM 205, a backend storage RAM 209 and a channel RAM 207. The memory subsystem 201 is dynamically allocated such that the input sample RAM 203, the coherent RAM 205, the channel RAM 207, and the backend storage RAM 209 each have varying sizes in various operational modes. In addition, the input sample RAM 203, the coherent RAM 205, and the backend storage RAM 209 are each accessed by different channels in different modes, and shared among different subsystems concurrently.

Input sample RAM 203 is controlled by a control structure 221 called FIFO1 control structure, or FIFO1 221. Coherent RAM 205 is similarly controlled by a control structure 223 called FIFO2 control structure, or FIFO2 223. As explained further below, the FIFO1 221 controls access to the input sample RAM 203, and the FIFO2 223 controls access to the coherent RAM 205. The term FIFO, as used herein, implies the first-in-first-out nature of access to the input sample RAM 203 and the coherent RAM 205 in an embodiment. In other embodiments, the control structure and access to the input sample RAM can have any other character, including for example, last-in-first-out. In FIG. 2, the FIFO 221 is shown collocated with the input sample RAM 203, and the FIFO2 223 is shown collocated with the coherent RAM 205. Typically, the FIFO1 221 and the FIFO2 223 are not collocated with their respective RAM areas, but are shown as such for illustration in FIG. 2.

The digital signal processing component 101 further includes a sequencer 217, which controls the sequencing of signal processing operations in the digital signal processing component 101. The sequencer 217 is shown as a separate component, but can be collocated with other components. For example, in embodiments described below, the sequencer 217 functionality resides partially on the signal processing subsystem 213 and partially on the FFT subsystem 215. A software component 219, hereinafter referred to as SW 219, controls the sequencer 217, and therefore the signal processing operations in the digital signal processing component 101, by storing words in the channel RAM 207. In one embodiment, the SW 219 is resident on the OEM processor 105 and/or the OEM memory 107, but this is not a requirement.

The digital signal processing component 101 receives digitized RF data samples from the RF component 103. The data samples are samples of data streams from SVs, each of which transmits a unique pseudorandom noise (PRN) code in a known manner. Broadly speaking, the digital signal processing component 101 processes the data samples to determine which satellite transmitted them, and also to extract information, such as ephemeris and almanac information, from the samples. As is known in the art, when the absolute location of four SVs, and their relative distances from a receiver, are known by the receiver, the location of the receiver can be known. The digital signal processing component 101 processes data samples in one of four modes depending on how much current location information is known.

The input sample subsystem 211 receives the input RF data samples at a rate determined by the sender. Under the control of the FIFO1, the input sample subsystem 211 stores the data samples in the input sample RAM 203 in a manner that is dependent on the operational mode of the digital signal processing component 101. The size of the input sample RAM 203 is also determined by the operational mode of the digital signal processing component 101. Under the control of the FIFO1, the signal processing subsystem 213 takes RF input samples from the RAM 203 to operate on. The operations performed on the RF signal samples can vary depending on the signal processing mode. For example, the signal processing subsystem 213 may or may not perform a decimation operation on the signal samples. The signal processing subsystem 213, using a matched filter in one embodiment, coherently accumulates data samples in the coherent RAM 205. Coherent accumulation is effectively accumulating I (in phase) and Q (quadrature) data for a specified period. The coherently accumulated data samples are taken from the coherent RAM 205 by the FFT subsystem 215 for FFT processing. The size of the coherent RAM 205 is also determined by the operational mode of the digital signal processing component 101.

In one situation, little or no information is known about the location of the receiver. In this situation, there is little or no information regarding which SVs are visible to the receiver, and the available time information is inaccurate. In this situation, the digital signal processing component 101 processes data samples in a "cold start" mode. In the cold start mode, as much data is processed as quickly as possible with a low degree of sensitivity, or resolution. This is because the search space for the SV signals is very large; there is no current data to focus the initial acquisition phase. In cold start mode, no coherent accumulation occurs, and data samples are sent straight to the FFT subsystem 215 from the signal processing subsystem 213 via a path 222.

In modes other than cold start mode, the FFT subsystem 215 takes a certain number of data samples out of the coherent RAM and performs FFT operations on them. In cold start mode, the FFT subsystem 215 operates on the coherent data samples straight from the SS2 213. The SS3 215 generates a number of frequencies as dictated by the particular processing mode. As an example, for an 8 sample, 16 point FFT, the FFT generates 16 frequencies. Not all of the 16 frequencies may be of interest. For example, the outer frequencies may not be useful. The number of frequencies is programmable. Desired frequencies are selected, packed in a more compact form, and stored in a noncoherent summation (NCS) region of the backend storage RAM 209, which accumulates noncoherent data, that is, the magnitudes derived from the I and Q data. As further described below, the backend storage RAM 209 is also used for storing peak values, or peaks. In one embodiment, the eight largest values are stored, as well as information regarding where they occurred in the data stream, e.g., at what code offset and at what frequency offset. The track history (TH) information is selected coherent data that is stored for examination by the SW 219. In one embodiment, the TH information is the output of a gather module (not shown). The gather module selects among the frequency outputs of the FFT subsystem 215, discarding unwanted frequencies. The gather module maintains data in a coherent form. The SW 219 can make decisions regarding the configuration of the signal processing component 101 by examining the TH information. The size of the backend storage RAM 209 is also determined by the operational mode of the signal processing component 101.

Various terms are used herein to describe processing epochs, including T1, PDI, and context. A T1 is a time period, in milliseconds, specified for coherent accumulation in the coherent accumulator for a channel. The length of a T1 is programmable and varies with the operational mode. For example, in some modes, it is desirable to accumulate for a longer period to look for a weaker signal. The signal processing subsystem 213 thus coherently accumulates on a T1 basis.

A PDI is a programmable number of T1s. The number of T1s that is fed into the FFT subsystem 215 at one time constitute a PDI. The number of T1s in a PDI is determined by how the FFT subsystem 215 is configured to process data in a particular mode. As stated above, the signal processing subsystem 213 coherently accumulates on a T1 basis. However, the FFT subsystem 215 operates on data on a PDI basis. Therefore, the FFT subsystem 215 only pulls data from the coherent RAM 205 when a complete PDI is available. For example, if the FFT subsystem 215 is configured as a 5-sample, 16 point, zero-padded FFT, the FFT subsystem 215 waits for 5 samples or 5 T1s to be complete and stored in the coherent RAM 205 before it begins pulling data out of the coherent RAM 205.

The use of the various subsystems is time-multiplexed between different channels. Context is a term used herein to denote the use of a particular subsystem for processing a particular channel. For example, for a particular channel, a context begins when the channel enters the signal processing subsystem 213, and the context ends when that channel leaves the signal processing subsystem 213. This implies that the signal processing subsystem 213 will run for a programmed number of milliseconds, consuming data from the input sample RAM 203, and then stop, which ends the context. A channel has a similar context with respect to the FFT subsystem 215.

As stated above, the SW 219 stores words in the channel RAM 207 that control the operation of the signal processing component 101. The stored words make up channel records. In one embodiment, the channel records are each 128 lines containing various types of data, but basically containing all of the channel specific data that the signal processing component is to use. The channel record includes programming information from the SW 219, load type information, size parameters, the size allocations for the input sample RAM 203, the coherent RAM 205, the backend storage RAM 209, and other areas of the RAM 201 for that particular channel. It includes code phase, carrier phase, carrier frequency, acceleration, and all other processing parameters for a single channel. The channel RAM 207 also contains a scratchpad area that stores "scratchpad" information for a channel. Scratchpad data is written by one channel in any available part of the scratchpad area, and later overwritten when another channel (which may be the same channel) writes into the scratchpad area. Scratchpad information includes a channel's counters from one context to the next. The use of the signal processing subsystem 213 and the FFT subsystem 215 is time multiplexed between different channels, so each channel must save its state.

The channel RAM 207 is initialized by the SW 219, but it is then updated by the signal processing subsystem 213, the FFT subsystem 215, and occasionally by the SW 219. For example there is a semaphore word in the channel RAM 207 that is used for communication between the signal processing subsystem 213, the FFT subsystem 215, and the SW 219. The semaphore word is a mechanism for synchronizing communication between the signal processing subsystem 213, the FFT subsystem 215, and the SW 219, which operate in a semi-asynchronous manner.

The channel records are essentially linked lists that include pointers to locations in the various RAMs, including the input sample RAM 203, the coherent RAM 205, and the backend storage RAM 209. The channel records thus store the configuration of the dynamically allocated RAM 201 for a context. The first channel record entry is a pointer to the next channel record. When a context begins, the channel RAM is accessed to determine an operating mode and the RAM allocation for the context. When the context is about to complete, updated channel information is stored in the channel record and the processing continues with the contents of the next channel record that is pointed to by the entry in the current channel record. The channel record also includes current counts and states, code phase information, and time alignments relative to the input data samples.

When a channel is initiated, a sequencer 313a (shown in FIG. 3 and described below) of the signal processing subsystem 213 accesses the channel RAM 207 and pulls in channel parameters required for the signal processing subsystem 213 to process that particular channel. The sequencer 313a also programs various signal processing elements (not shown) of the signal processing subsystem 213, such as a matched filter, and a coherent accumulator, with parameters as needed to process that channel. The parameters, for example, determine the number of milliseconds for which the matched filter is to perform processing. When the matched filter is finished processing, the matched filter signals the sequencer 313a that it is finished, and the sequencer 313a moves on to the next channel.

The channel RAM 207 includes a linked list that stores the location of the channel RAM for the next channel, and so on.

The FFT subsystem 215 also includes a sequencer 315a (shown in FIG. 3 and described below) that accesses the channel RAM to determine how to process data. The FIFO2 223 controls access to the coherent RAM 205 for both the FFT subsystem 215 and the signal processing subsystem 213. For example, the FIFO2 223 lets the FFT subsystem 215 know when there is data to operate on in the coherent RAM 205. The FIFO2 223 also lets the signal processing subsystem 213 know when it is about to overwrite data that the FFT subsystem 215 has not used yet.

Figure 3:
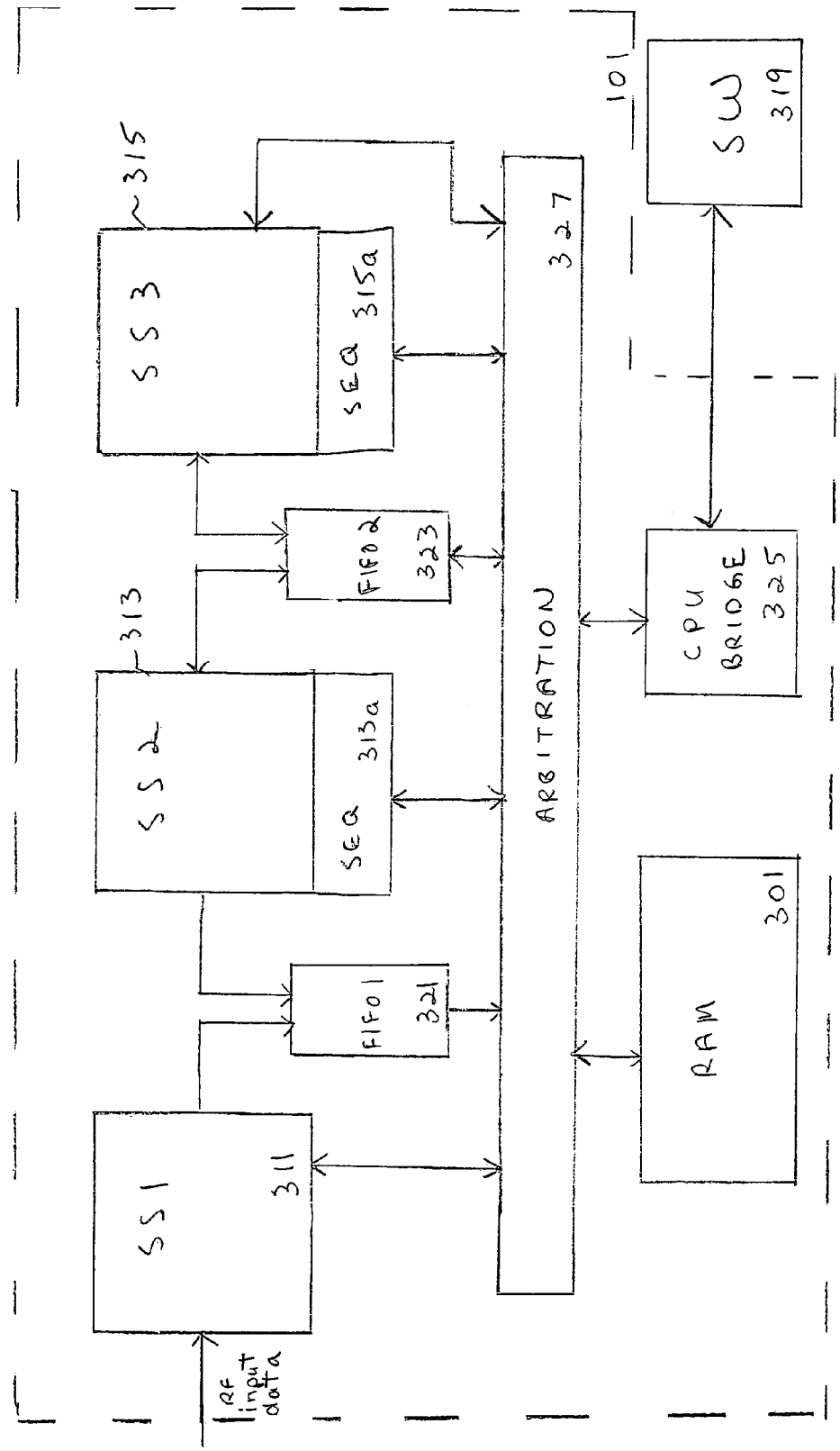
FIG. 3 is block diagram of an embodiment of the signal processing component, including an arbitration unit.

FIG. 3 is block diagram of an embodiment of the signal processing component 101 showing additional elements, including an arbitration unit 327. An input sample subsystem 311 and a signal processing system 313 access a memory subsystem, or RAM 301, under control of a FIFO1 321. In one embodiment, the sequencer functionality for the signal processing subsystem 313 is collocated with the signal processing subsystem 313 in an SS2 sequencer 313a. One function of the sequencer 313a is to access a channel RAM area of the RAM 301 to read out channel parameters and to write updated channel parameters back to the channel RAM area of the RAM 301.

The signal processing subsystem 313 and the FFT subsystem 315 access the RAM 301 under control of a FIFO2 323. In one embodiment, the sequencer functionality for the FFT subsystem 315 is collocated with the FFT subsystem 315 in an SS3 sequencer 315a. The FIFO1 321, the SS2 sequencer 313a, the FIFO2 323, and the SS3 sequencer 315a communicate with the arbitration unit 327 for access to the RAM 301.

The arbitration unit 327 further communicates with a SW element 319 through a central processing unit (CPU) bridge 325 for access by the SW 319 to the RAM 301.

The input sample subsystem 311 sends requests for access to RAM 301 through the FIFO 321 and receives grant signals from the arbitration unit 327. After a grant signal is received by the input sample subsystem 311, it sends an address to the FIFO1 321 indicating where it is storing input sample data, and the input sample subsystem stores the input sample data in the RAM 301.

When the signal processing subsystem 313 seeks to process input data samples, it sends a request for access to the input sample area of the RAM 301 through the FIFO1 321 and receives a grant signal from the arbitration unit 327. After a grant signal is received by the signal processing subsystem 313, it receives data samples from the RAM 301. When the signal processing subsystem 313 seeks to store processed coherent data in the coherent RAM area of the RAM 301, it sends a request signal through the FIFO2 323 to the arbitration unit 327. From the channel record, the sequencer 313a determines the appropriate address(es) at which to store the coherent data. The signal processing subsystem 313 receives a grant signal from the arbitration unit 327, and the storage addresses are sent by the signal processing system to the RAM 301, as is the coherent data to be stored.

When the FFT subsystem 315 seeks to process coherent data, it sends a request for access to the coherent data area of the RAM 301 through the FIFO2 323 to the arbitration unit 327. When the request is granted, the address, which again is known from the channel record, is sent to the coherent data area of the RAM 301 and the coherent data is read out to the FFT subsystem 315.

The SW 319 requests access to the RAM 310 through the arbitration unit 327 to write records in the channel RAM area which dictate the operation of the signal processing component 101. The SW 319 further requests access to the RAM 310 through the arbitration unit 327 to read data, such as TH data, report data, and error data that indicate a status of the subsystems and provide a basis for ongoing programming of the signal processing component 101 through the channel records in the channel RAM.

Figure 4:
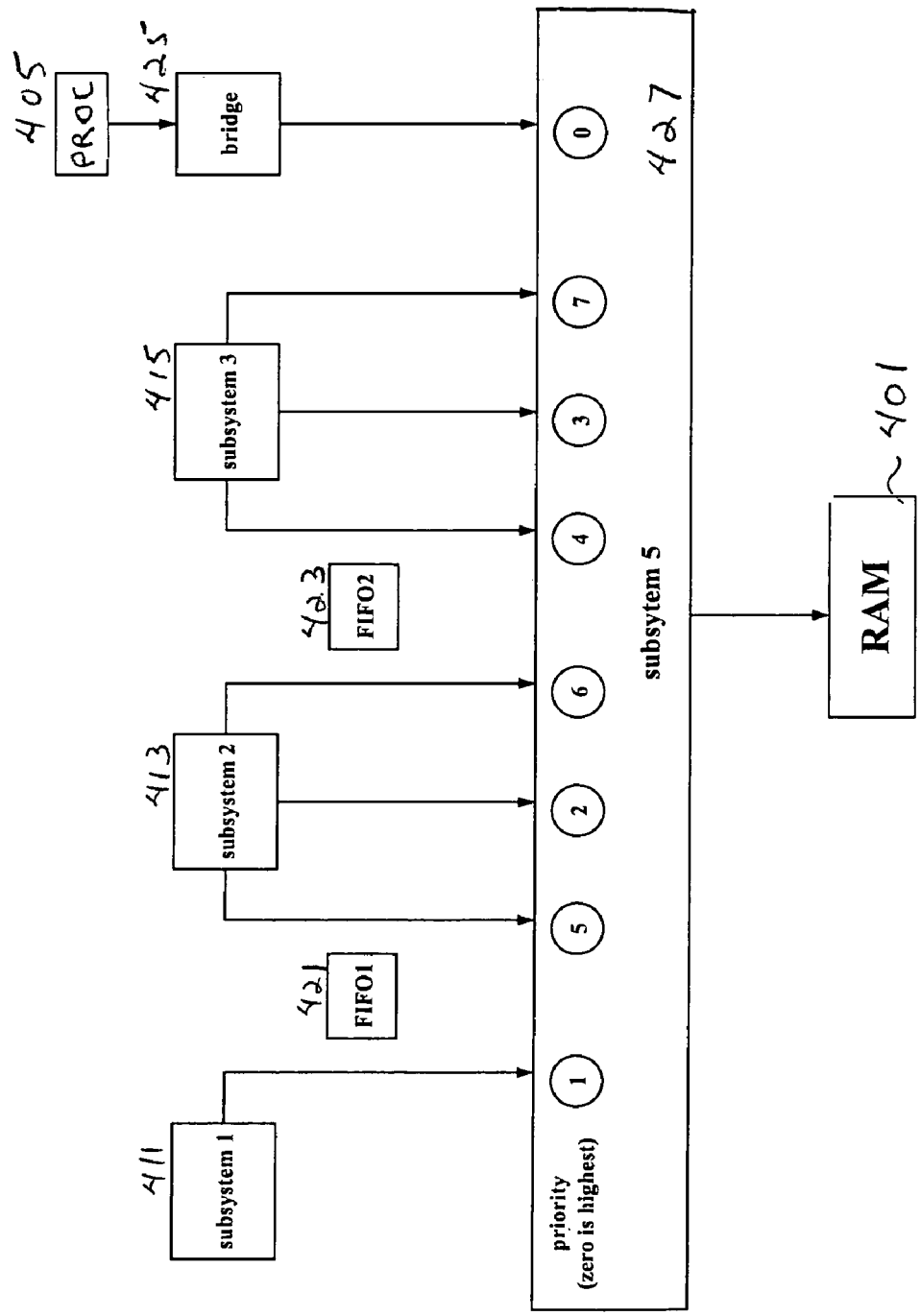
FIG. 4 is a block diagram showing an arbitration unit and illustrating an embodiment in which priorities as assigned to different entities to access a RAM.

FIG. 4 is a block diagram showing an arbitration unit 427 and illustrating priority assignments to different entities to access a RAM 401 in an embodiment. The OEM processor 405, which accesses the RAM 401 through the CPU bridge 425 has the highest priority, or priority 0. The priorities are arbitrarily designated such that a lower number indicates a higher priority, but any other designation is possible. An input sample subsystem 411 has a next highest priority of 1. Because the input sample subsystem 411 receives a stream of RF data at a rate that is not under its control, the input sample subsystem 411 has less ability than other subsystems to control its own processing rate, and therefore it is assigned a high priority for access to the RAM 401.

A signal processing subsystem 413 is assigned a priority of 2 for access requests from its sequencer, a priority of 5 for access requests through a FIFO1 421 for reading input data samples from the input sample area of the RAM 401, and a priority of 6 for access requests through the FIFO2 423 for writing coherent data to the coherent data area of the RAM 401.

An FFT subsystem 415 is assigned a priority of 3 for access requests from its sequencer, a priority of 4 for access requests through the FIFO2 423 for reading coherent data from the coherent data area of the RAM 401, and a priority of 7 for writing NCS, TH, and report data to the NCS area of the RAM 401.

Figure 5:
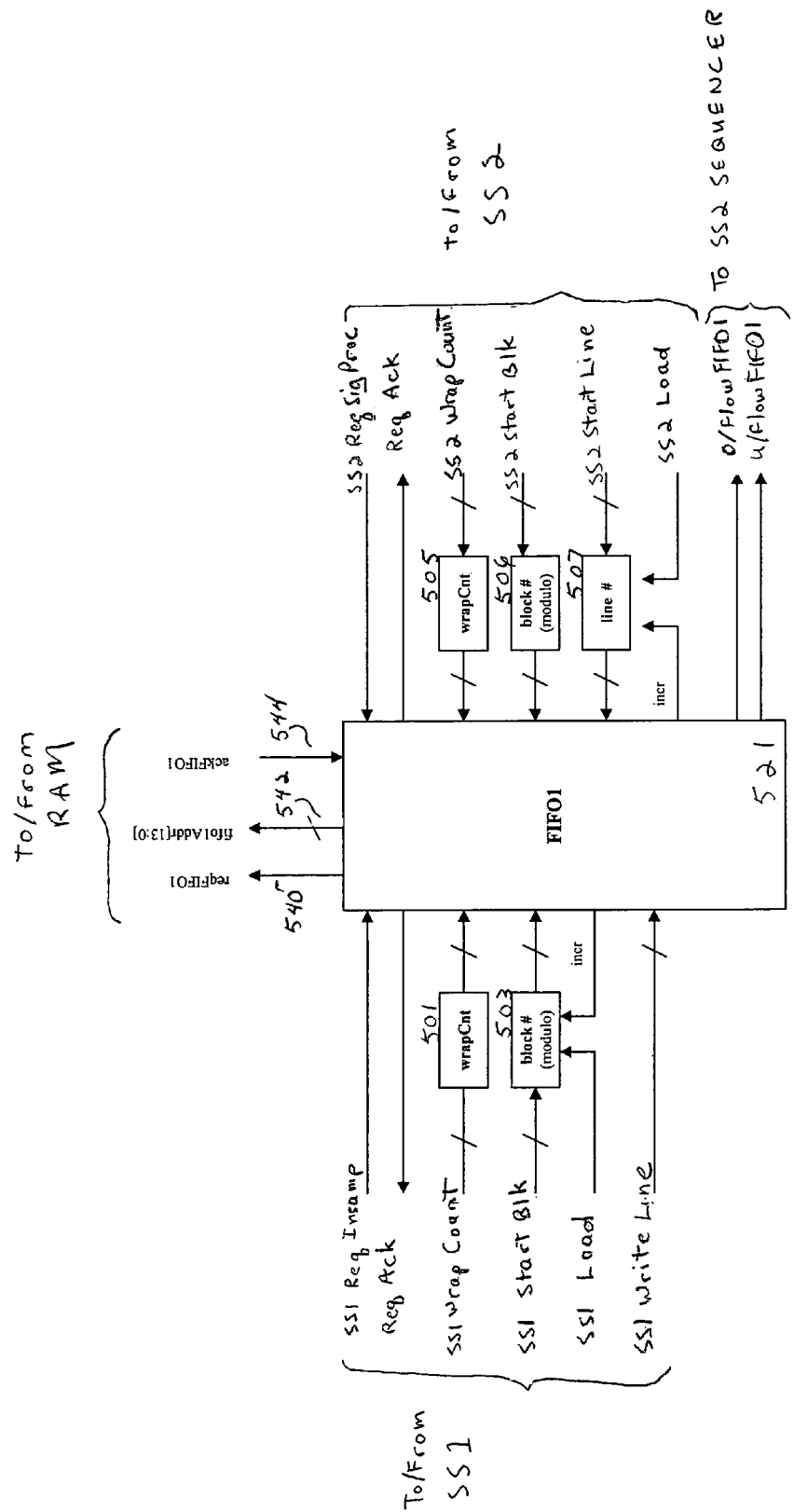
FIG. 5 is a block diagram of a control structure (FIFO1) showing some of the signaling that takes place in controlling access to an input sample RAM.

FIG. 5 is a block diagram of a FIFO1 521 showing some of the signaling that takes place in controlling access to the input sample RAM 203. With reference to the left side of FIG. 5, and also with reference to FIG. 2, the input sample subsystem 211 requests access to the input sample RAM area 203 of the RAM 201 to store input data samples. The signal processing subsystem 213 requests access to the input sample RAM area 203 of the RAM 201 to read out input data samples.

The input sample subsystem 211 sends an SS1 Req Insamp signal to the FIFO1 521 to request to write input data samples. The FIFO1 521 acknowledges receipt of the request with a Req Ack signal. The input sample subsystem 211 sends a wrap count 501 and a start block number 503 to the FIFO1 521. In a circular buffer mode, which is applicable in operational modes of the signal processing component, except for the cold start mode, the input sample RAM 203 is written until it is filled, and then overwritten. In one embodiment, the input sample RAM 203 is filled from the bottom to the top. When the input sample RAM 203 is full, overwriting begins at the bottom. The wrap count 501 increments each time the input sample RAM 203 is filled and begins to be overwritten.

The start block number 503 indicates the start of a block of input data samples. The start block number 503 is modified by a load signal, SS1 Load, from the input sample subsystem 211. The Load signal initiates a write operation. When a block has been written, the FIFO1 increments the block count 503 with an Incr signal. The Write Line, from the input sample subsystem 211, is a 7-bit line within a block, which is written to the FIFO1 during writes to the FIFO1.

With reference to the right side of FIG. 5, and also with reference to FIG. 2, the signal processing subsystem 213 requests access to data samples in the input sample RAM 203 with a SS2 Req Sig Proc signal. The FIFO 521 acknowledges the request with a Req Ack signal. The signal processing subsystem 213 sends a wrap count 505, a start block count 506, and a line number 507 to the FIFO1 521.

In a circular buffer mode, which is applicable in operational modes of the signal processing component, except for the cold start mode, the input sample RAM 203 is written until it is filled, and then overwritten. The wrap count 505 increments each time the input sample RAM 203 is filled and begins to be overwritten. The start block number 506 indicates the start of a block of input data samples. The start block number 506 is modified by a load signal, SS2 Load, from the signal processing subsystem 213. The SS2 Load signal initiates a read operation.

The FIFO1 521 also sends an overflow and an underflow signal to the sequencer 217. Underflow occurs when the signal processing subsystem 213 is attempting to read out data from a location that has not been written yet. When underflow occurs, the signal processing subsystem 213 must wait, or pause. Overflow occurs, in the case of a cyclic write mode, when the top of the input sample RAM 203 is reached and the write pointer goes back to the bottom to begin overwriting, yet the signal processing subsystem 213 has not read out the data about to be overwritten, or already overwritten. Because of the streaming nature of the data received by the input sample subsystem 211, an overflow condition can be detected, but not prevented. In one embodiment, when an overflow occurs in the middle of processing for a channel, "garbage", or invalid data is processed until "good" data is available again. If a channel is being initialized and an overflow occurs, an error signal is sent to the SW 219, the channel is shut down, and the SW 219 decides how to proceed.

Referring to the top of the FIFO1 521, the FIFO1 communicates with the RAM 201 using a request signal 540, an address signal 542, and an acknowledge signal 544.

FIGS. 6, 7, 8 and 9 are block diagrams illustrating configurations of the signal processing component 101, including memory allocations, for various operational modes for an embodiment. The operational modes illustrated include a cold start mode, a coarse acquisition mode, a hot start mode, and a tracking mode.

The cold start mode is applicable when little or no information is available to the signal processing component 101 regarding its own location. For example, if the signal processing component 101 were installed in a handheld device that was carried far away from the location at which it last acquired GPS satellites, it would not know which satellites are visible. Therefore a very broad, low sensitivity search for satellites is performed, necessitating the processing of a large quantity of data.

The coarse acquisition mode is appropriate when some information is known about the location of the signal processing component 101. Typically, the identity of at least some of the visible satellites is known.

The hot start mode is appropriate when the signal processing component 101 has some very good information about its location. For example, the signal processing component may have navigated within the last day, establishing its location to within about a 100 ml radius. Or possibly, an external source supplied the ephemeris data and satellite time.

The track mode is appropriate when the signal processing component 101 has excellent information about its position, and is tracking satellites it has already acquired. In the track mode, it is possible to turn off more of the signal processing component 101 functionality, thus consuming less power.

Figure 6:
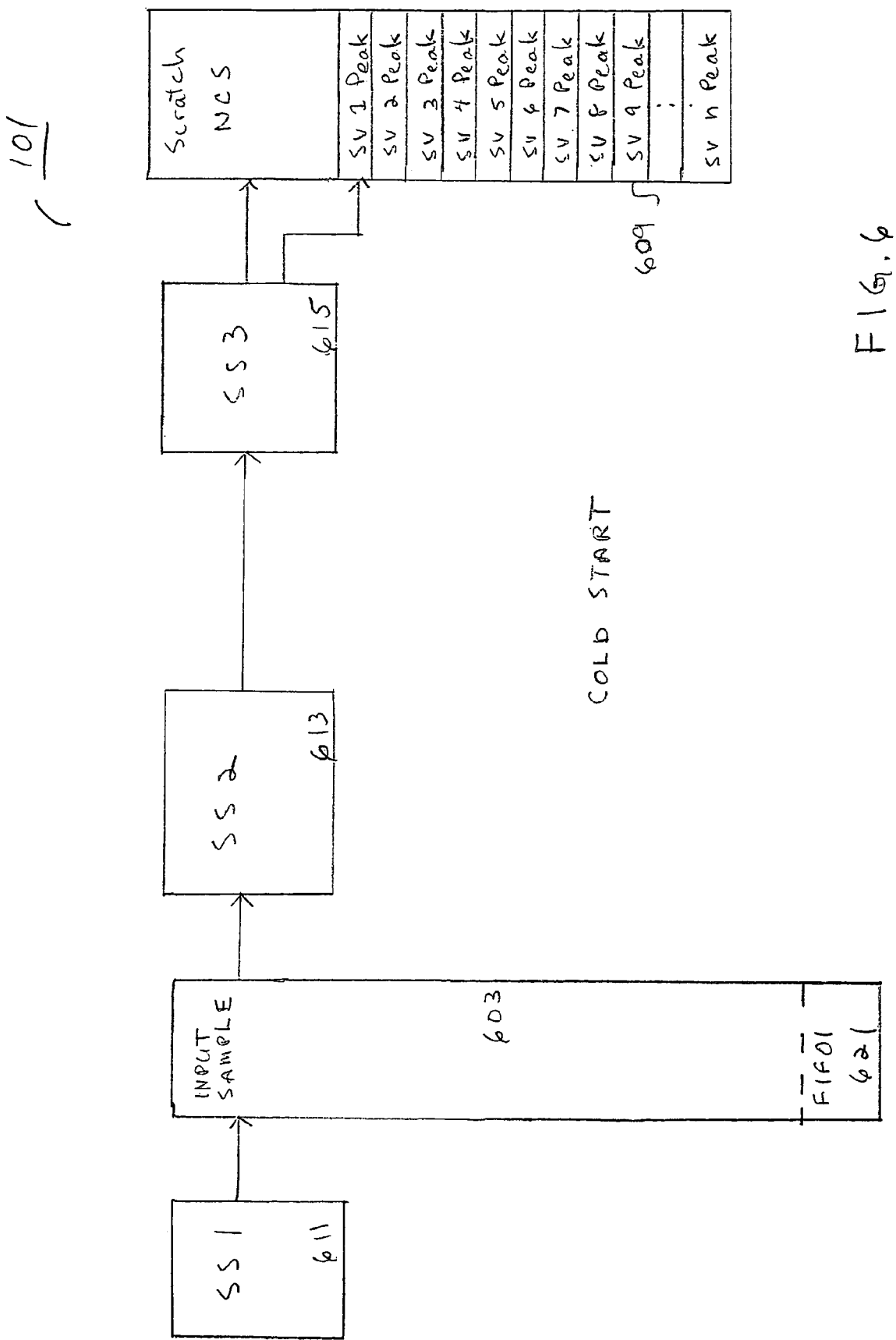
FIG. 6 is a block diagram illustrating a configuration of the signal processing component, including memory allocations, for a cold start mode.

Referring to FIG. 6, a configuration of the signal processing component 101, including memory allocation, in the cold start mode is illustrated. In the cold start mode, there is no coherent RAM area. The available RAM area includes a relatively large input sample buffer 603 that is used as snapshot, or one-shot input sample RAM. In one embodiment, the size of the input sample RAM 603 is approximately 100 Kbytes. As stated, the input sample RAM 603 is used in a one-shot manner. After the input sample RAM 603 is filled, the RF input is no longer received, and the various subsystems operate on the data in the input sample RAM 603 multiple times, as described below. This makes it possible to turn off the RF receiver after the input sample RAM 603 is filled, which reduces power consumption.

The input sample subsystem 611 writes input data samples into the input sample RAM 603 under control of the FIFO1 621. The signal processing subsystem 613 reads input data samples out of the input sample RAM 603 under control of the FIFO1 621. The signal processing subsystem 613 processes the input data samples and transmits them as coherent data directly to the FFT subsystem 615.

For a particular possible satellite, which we will call SV 1, the data stored in the input sample RAM 603 is reprocessed, or replayed, for every possible frequency SV 1 might have, as well as the entire possible oscillator range and Doppler range. The input sample data in the input sample RAM 603 can be replayed as many as twenty times for each satellite. The data is then passed to a backend storage RAM 609, which stored noncoherent summation data. The backend storage RAM 609 includes an NCS data "scratch" region, and a peak region. The scratch region stored noncoherent data in a cyclic fashion, and can be shared with channels operating in other modes that are not the cold start mode. The largest eight peaks for each satellite are saved in the peak region. The backend storage RAM 609 in one embodiment includes approximately 8 Kbytes for the scratch NCS area, and approximately 2.4K for the peak region, which stores about 50 peaks. As a channel completes, the SW 219 goes through the peak list, decides which peak might represent a signal and selects only these for verification. The peak space freed up by the rejected peaks is filled with new peaks.

As an example, the configuration of the signal processing component 101 for the cold start mode can include parameters of the following approximate values: a PDI of one millisecond; a frequency coverage per processing run of four KHz; and a sensitivity, or resolution, of 28 dbHz.

Figure 7:
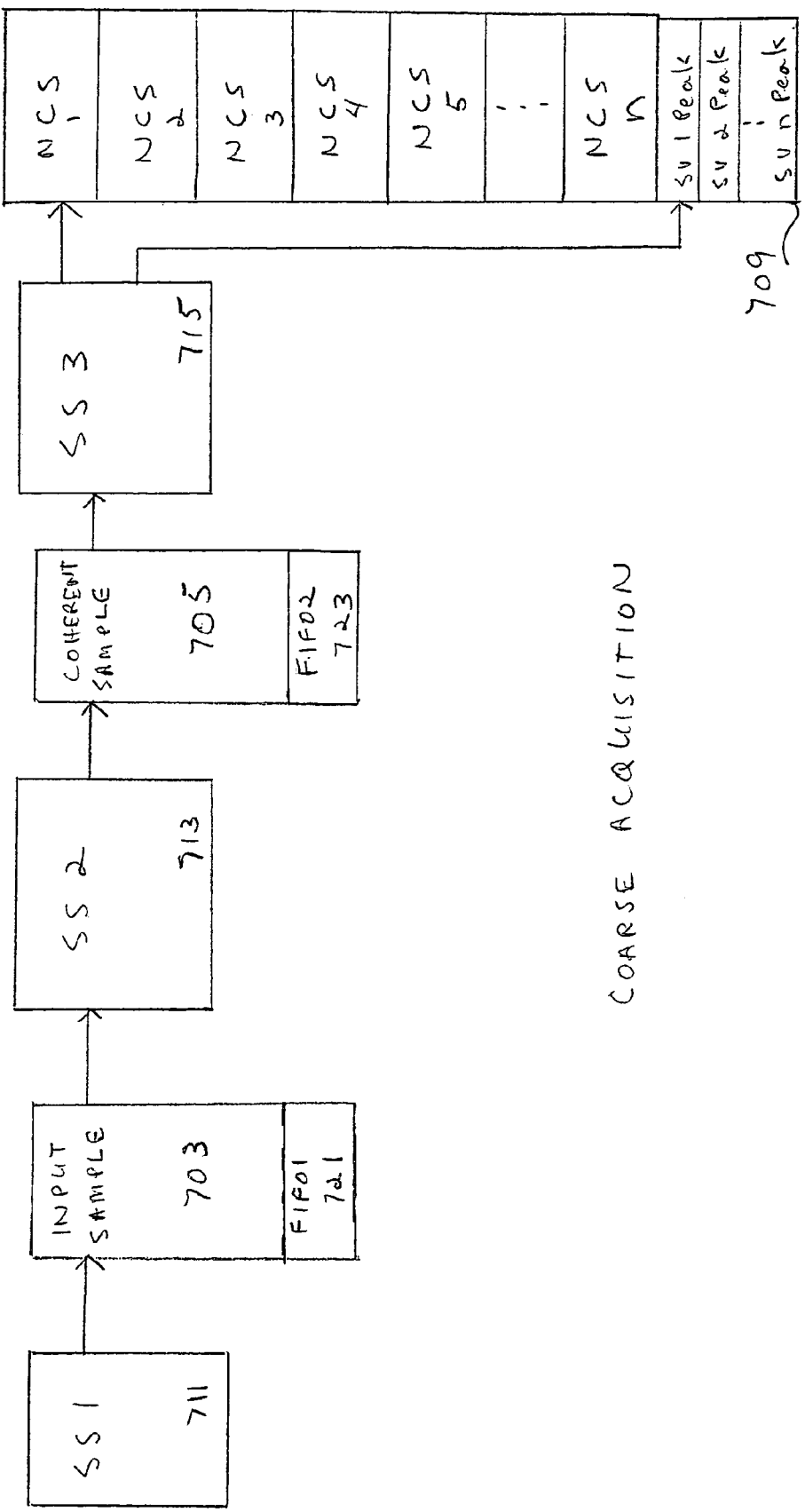
FIG. 7 is a block diagram illustrating a configuration of the signal processing component, including memory allocations, for a coarse acquisition mode.

FIG. 7 is a block diagram of a configuration of the signal processing component 101, including memory allocation, in the coarse acquisition mode. In the coarse acquisition mode, the largest portion of the memory is allocated for a backend storage RAM 709, and an input sample RAM 703 is relatively small. For example, in one embodiment the input sample RAM 703 is approximately 10K in size. The input sample RAM 703 is used as a short, circular buffer. A coherent sample RAM 705, which stores coherent data samples, is used as a scratch buffer.

The input sample subsystem 711 receives input data samples and stores them in the input sample RAM 703. In the coarse acquisition mode, one or two visible satellites are typically known. Therefore, these known satellites can be searched for concurrently. The signal processing subsystem 713 processes the input sample data and fills a coherent sample RAM 705 with 7 milliseconds of data representing one frequency/satellite combination. The FFT subsystem 715 operates on the coherent data that is stored in the coherent sample RAM 705 and stores the resultant NCS data in the backend storage RAM 709. Peaks associated with the NCS data are also stored in the backend storage RAM 709. In this mode, the backend storage RAM 709 is shared between channels, but is "dedicated NCS" storage in that different regions are dedicated to NCS data from different channels. The NCS 1 data is for channel 1, the NCS 2 data is for channel 2, etc.

In the coarse acquisition mode, as much memory as possible is devoted to the backend storage RAM 709 because performance is improved when the OEM processor has more NCS data to operate on. As an example, the configuration of the signal processing component 101 for the cold start mode can include parameters of the following approximate values: a PDI of seven milliseconds; a frequency coverage per processing run of 750 Hz; and a sensitivity of 20 dbHz. In the coarse acquisition mode, the input sample RAM 703 is larger than PDI, and the coherent RAM 705 is larger than PDI. As used herein, to be larger or smaller than PDI means that the allocated memory space stores less more than or less than the amount of data that can be processed in the time period of a PDI.

Figure 8:
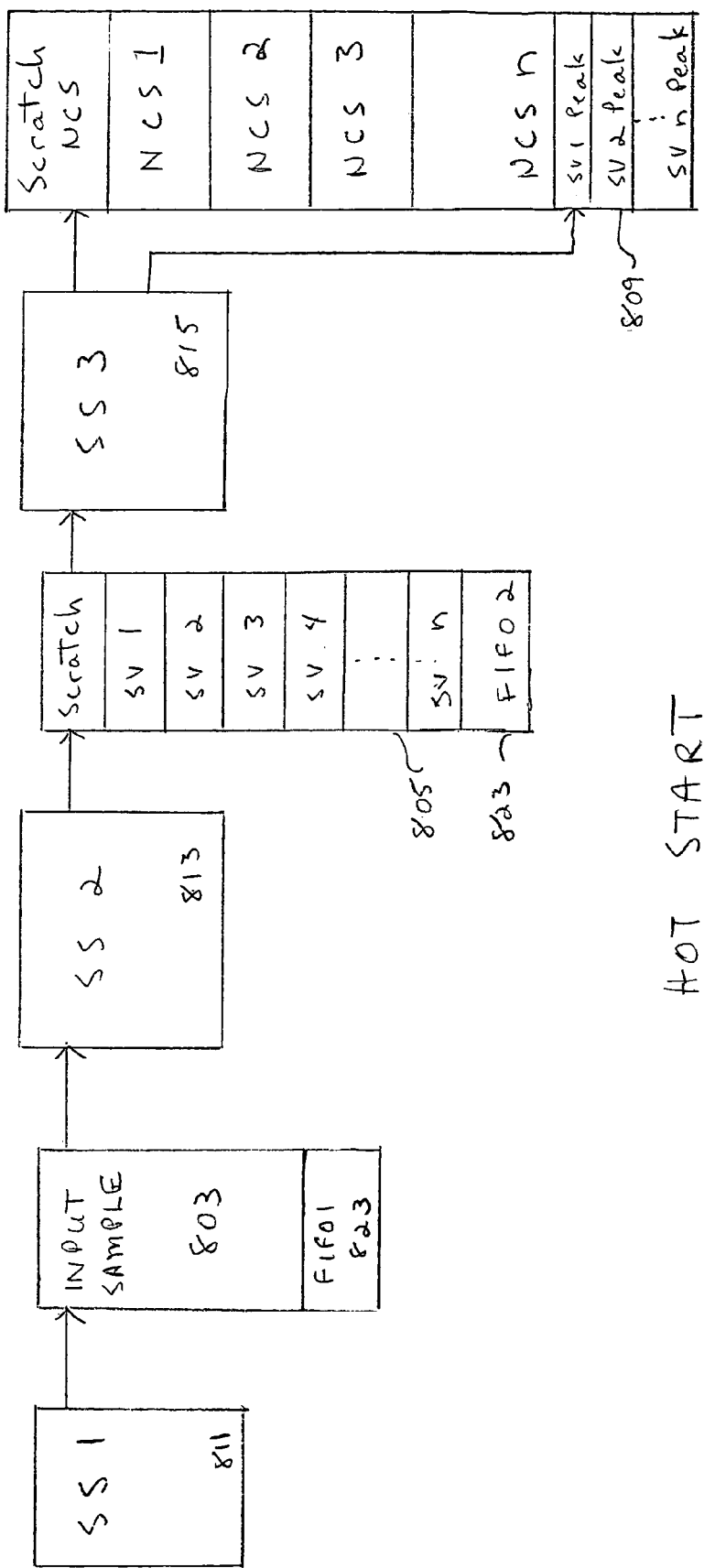
FIG. 8 is a block diagram illustrating a configuration of the signal processing component, including memory allocations, for a hot start mode.

FIG. 8 is a block diagram of a configuration of the signal processing component 101, including memory allocation, in the hot start mode. In the hot start mode, a full code phase search is not required. Position is known to a much greater degree than is the case for cold start mode or coarse acquisition mode. For example, the time uncertainty is approximately one microsecond. The position uncertainty might be a cell site radius in a cellular network. Some aiding information might also be available to narrow the initial location uncertainty.

In the hot start mode, an input sample RAM 803 is a relatively short circular buffer. For example, the input sample RAM 803 is 5K–20K of memory. In the hot start mode, the input sample subsystem 811 receives input data samples and stores them in the input sample RAM in a circular buffer manner. The signal processing subsystem 813 processes the input sample data and stores it in a coherent RAM 805. In this mode, the coherent RAM 805 contains many small, dedicated regions for individual satellites. In addition, the coherent RAM 805 includes a scratchpad, or scratch, portion that can be used by various channels concurrently, in other modes than the hot start mode. As previously described, Scratchpad data is written by for one channel in any available part of the scratchpad area, and later overwritten when another channel (which may be the same channel) writes into the scratchpad area. In contrast, dedicated areas can only be written or overwritten by data relevant to one SV.

Dedication of the areas in the coherent RAM 805 for individual satellites allows a smaller input sample buffer 803 and the ability to still run a relatively large PDI. In this mode, the input sample RAM 803 can be less than PDI. The FFT subsystem 815 processes the coherent data from the coherent RAM 805, and outputs NCS data which is stored in a backend storage RAM 809 in a dedicated fashion. That is, the backend storage RAM 809 is divided into dedicated regions, NCS 1, NCS 2, etc., for individual satellites. The backend storage RAM 809 also includes a scratch portion that is not dedicated, and can be used by other channels in other modes concurrently. The backend storage RAM 809 also includes a dedicated peak portion to save peaks on an SV-by-SV basis. As an example, the configuration of the signal processing component 101 for the cold start mode can include parameters of the following approximate values: a PDI of 10 or 20 milliseconds; a frequency coverage per processing run of 750 Hz; and a sensitivity of 15 to 12 dbHz.

Figure 9:
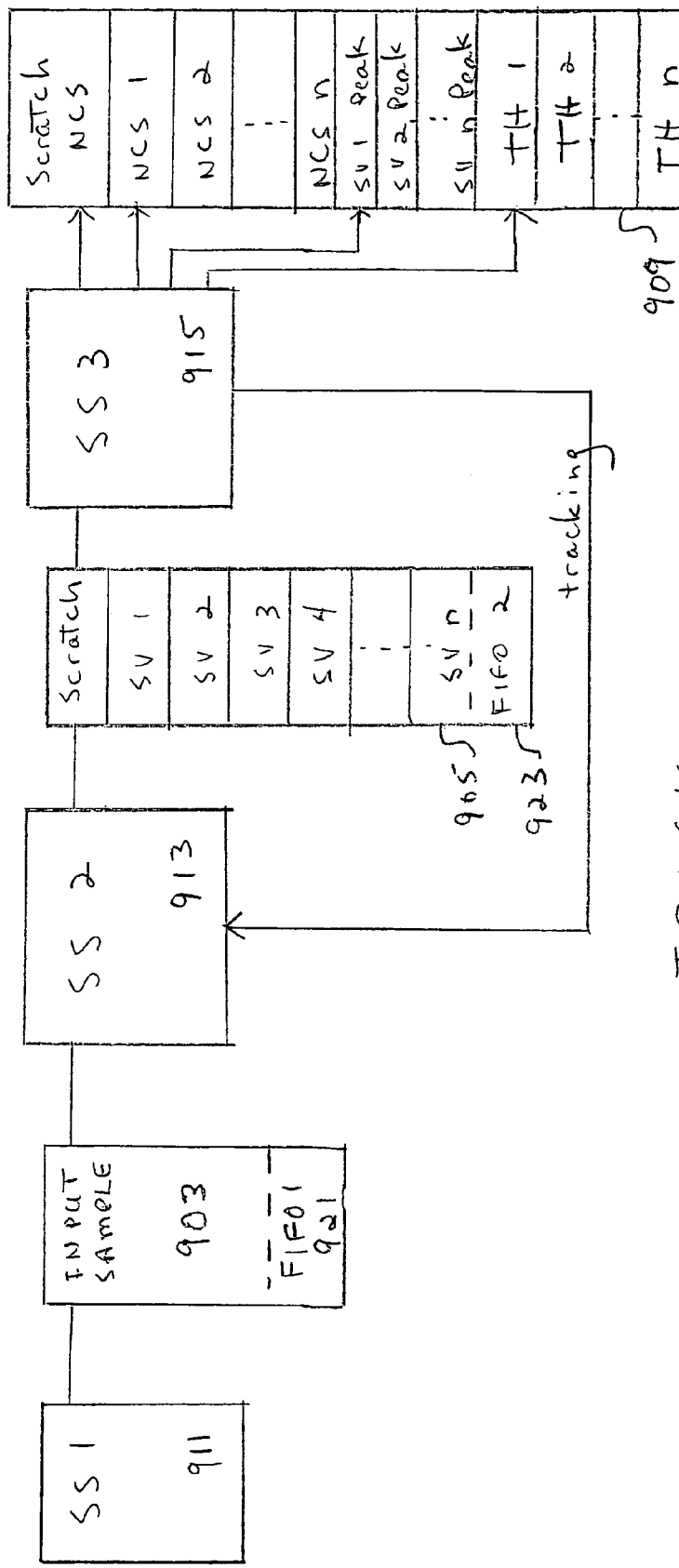
FIG. 9 is a block diagram illustrating a configuration of the signal processing component, including memory allocations, for a tracking mode.

FIG. 9 is a block diagram of a configuration of the signal processing component 101, including memory allocation, in the track mode. In the track mode, the signal processing component 101 has excellent information about its position, and is tracking satellites it has already acquired. In the track mode, it is possible to turn off more of the signal processing component 101 functionality, thus consuming less power.

In the track mode, the input sample RAM 903 is relatively small. For example, in one embodiment, the input sample RAM 903 is approximately 20K of memory. The input sample RAM 903 is smaller than PDI, for example, about 5 milliseconds. The input sample subsystem 911 stores input data samples in the input sample RAM 903 in a circular buffer fashion. The signal processing subsystem 913 processes the input data samples from the input sample RAM 903 and stores them in a coherent RAM 905, which is larger than PDI. The coherent RAM 905 includes a scratch region, which can be shared among different channels in different modes concurrently, and a dedicated region for storing coherent data on a satellite-by-satellite basis. The FFT subsystem 915 processes the coherent data from the coherent RAM 905 and stores NCS data in a backend storage RAM 909. The FFT subsystem 915 further feeds back data to the signal processing subsystem 913, such as the data boundary on the signal, to be evaluated and used as a basis for possible adjustment of tracking.

The backend storage RAM 909 includes a scratch region that can be shared among different channels in different modes concurrently, a dedicated peak region, and a track history (TH) region that stores various data as further described below. The dedicated NCS region stores NCS data for each satellite in a dedicated region, and the dedicated peak region stores peaks for each satellite in a dedicated region.

The track mode stores addition TH output data not stored in other modes. This TH data is used in various ways. For example, the TH includes coherent data that is used by a hardware tracker (not shown). The hardware tracker examines the coherent data to verify that the correct signals are being tracked. Adjustments can be made as necessary through the SW 219 and the channel RAM. Even though in track mode, a small search window is kept open by storing additional data selectively in the backend storage RAM 909. The search window is used to look for spurious large signals that may make the signal processing subsystem track wrong signals. The search window is also used to find new visible satellites as the visible satellites change.

As an example, the configuration of the signal processing component 101 for the track mode can include parameters of the following approximate values: a PDI of 4, 5, 10 or 20 milliseconds; a frequency coverage per processing run of 100 Hz–750 Hz; and a sensitivity of 12–50 dbHz.

Figure 10:
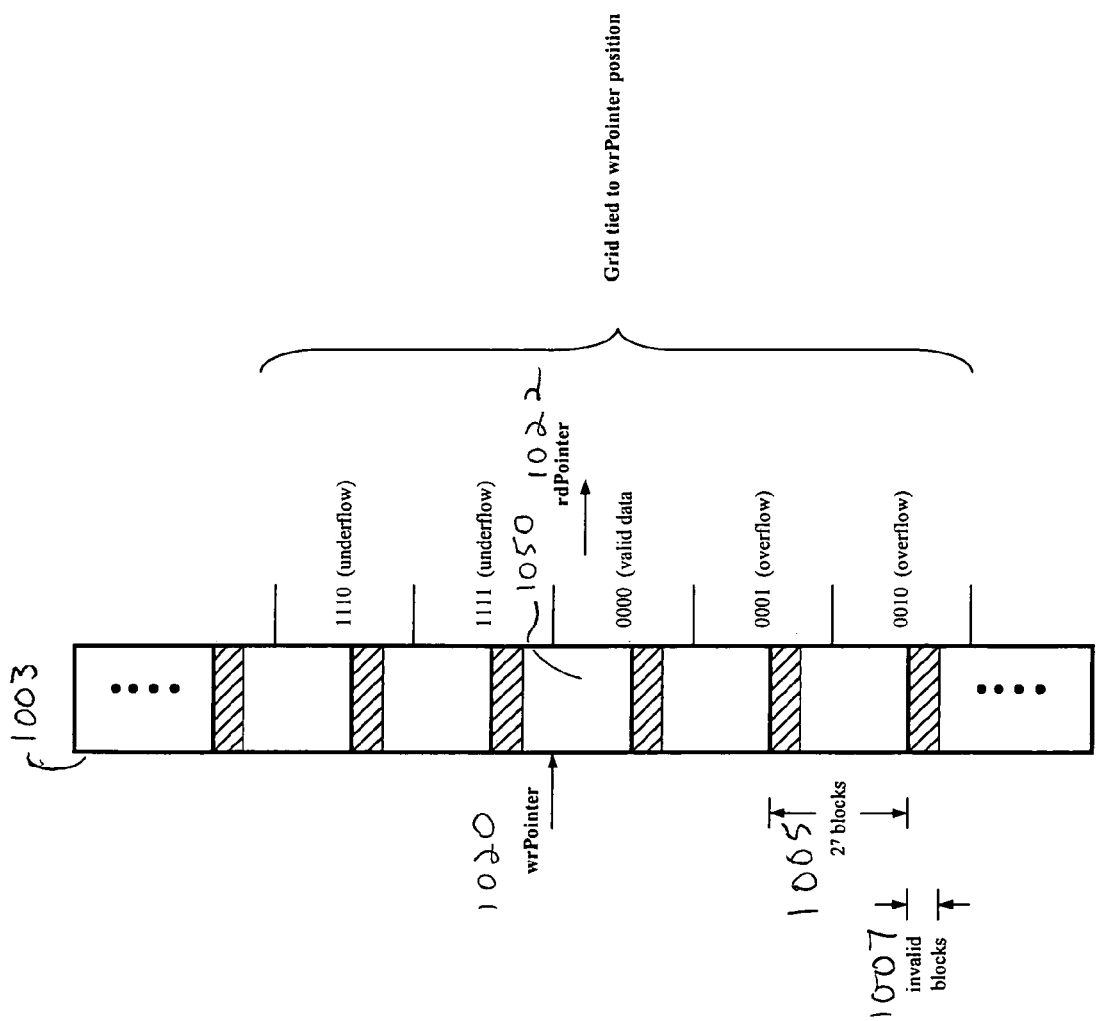
FIG. 10 is a block diagram showing some aspects of how data is stored in an input sample RAM.

FIG. 10 is a block diagram showing some aspects of how data is stored in an input sample RAM 1003. This diagram shows how regions of the dynamically configurable and allocable RAM 201 are allocated to the input sample RAM 203. A write pointer 1020 is shown on the left of the input sample RAM 1003, and a read pointer 1022 is shown on the right of the input sample RAM 1003. Each block of the input sample RAM 1003 that is represented as a clear (not cross-hatched) region is an actual address space used for the input sample RAM 203. A region denoted 1005 contains potentially valid data, and a subregion 1007 of invalid data, which is shown with hatching. There is only one such block region 1005 that contains valid data at any one time. In FIG. 10, the region of current valid data is denoted by 1050. The region 1050 is also the region to which the write pointer 1020 and the read pointer 1022 currently point, as shown. Overflow and underflow conditions are detected by comparing the value of the read pointer 1022 to the value of the write pointer 1020.

Each block region 1005 represents an entire address space with an invalid block 1001. Each block region 1005 includes the same addresses. For example, if a wrap pointer is tied to the top of the address, the address keeps incrementing as one progresses up the diagram. If one physically goes from the bottom block region 1005 to the block region 1005 immediately above it, one is going to the bottom of the address space. That is, the same address space is stacked over and over. The region cross-hatched invalid block regions 1007 are part of the full binary range that may not be used because of binary addressing. The invalid block regions 1007 are skipped.

On the right of the input sample RAM 1003, different regions are denoted, including the valid data region 1050, and regions in which underflow and overflow conditions would occur for a given write pointer 1020.

Figure 11:
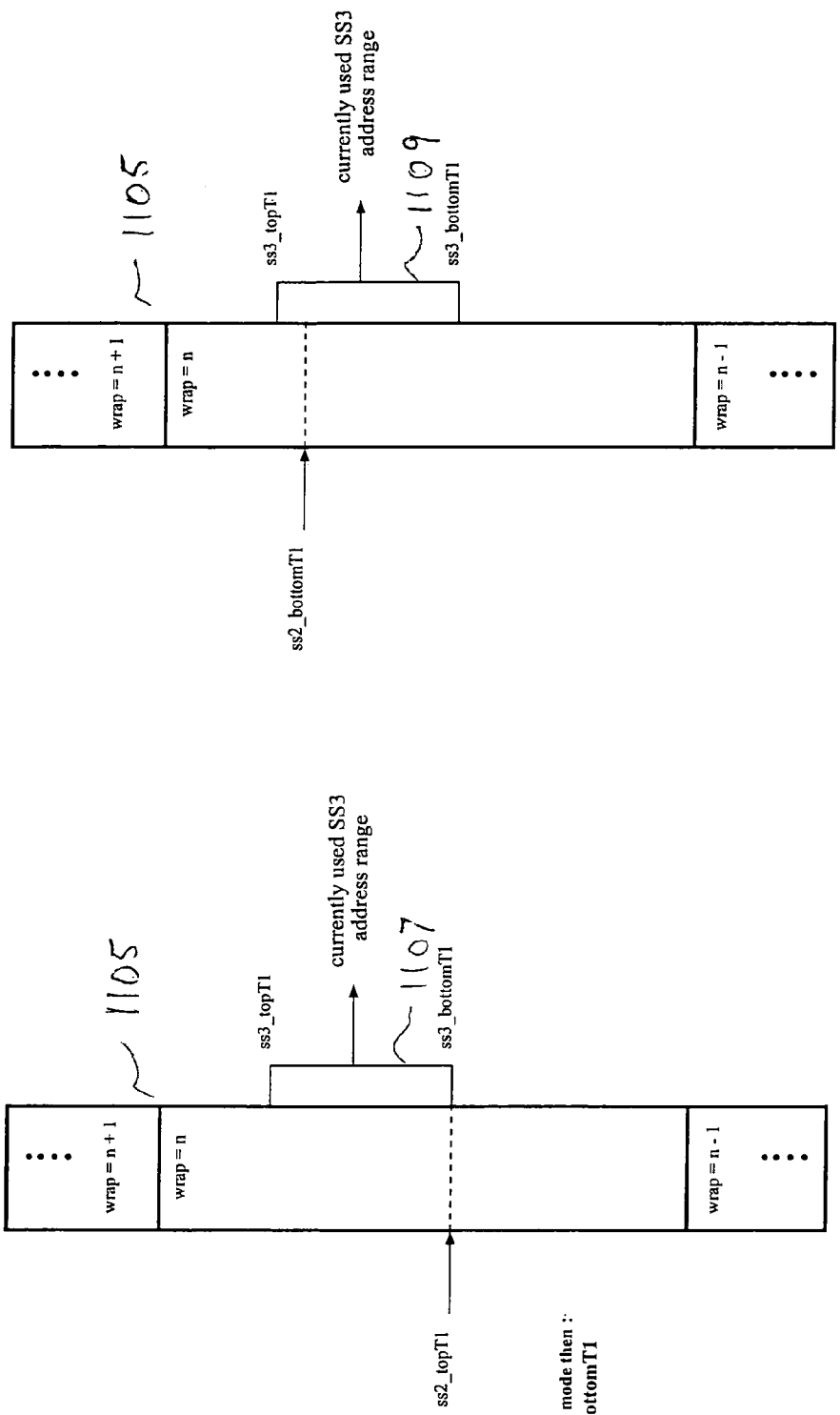
FIG. 11 is a diagram illustrating overflow and underflow conditions for a coherent RAM.

FIG. 11 is a diagram illustrating overflow and underflow conditions for a coherent RAM 1105. With reference also to FIG. 2, the FFT subsystem 215 accesses an entire range of addresses at one time in the coherent RAM 205. If the address range is not available, the FFT subsystem 215 stalls with an underflow. The diagram of FIG. 11 shows underflow and overflow conditions in the coherent RAM 1105 given the desire to access ranges of addresses. On the left side of FIG. 11, overflow is illustrated. A rectangle 1107 defines a currently used FET subsystem 215 address range in the region labeled wrap=n. The total address range for the coherent RAM 1105, as previously described with reference to FIG. 10 and the input sample RAM 1003, is stacked and repeated. This is represented by the wrap number in FIG. 11. Overflow will be reached where an SS2_topT1 pointer as shown on the left is trying to write into a region from which the FFT subsystem 215 (SS3) is trying to read data out. The FFT subsystem 215 will be stalled when the SS2_topT1 pointer reaches the region where the FFT subsystem 215 (SS3) is trying to read. An overflow occurs when (SS2 top address)= (SS3 bottom address). It is possible to stall the FFT subsystem 215 because access to the coherent RAM is controllable through the FIFO2 223. Less control over the input sample RAM 203 is possible because it is not possible to control the live RF input.

The right side of FIG. 11 shows the underflow condition. A rectangle 1109 defines a currently used FFT subsystem 215 address range in the region labeled wrap=n. ss2_bottom has not reached the top of the address range needed by the FFT subsystem (SS3) 215. The required range is not "full" yet. An underflow occurs when (ss2 bottom address)<(ss3 top address).

Figure 12:
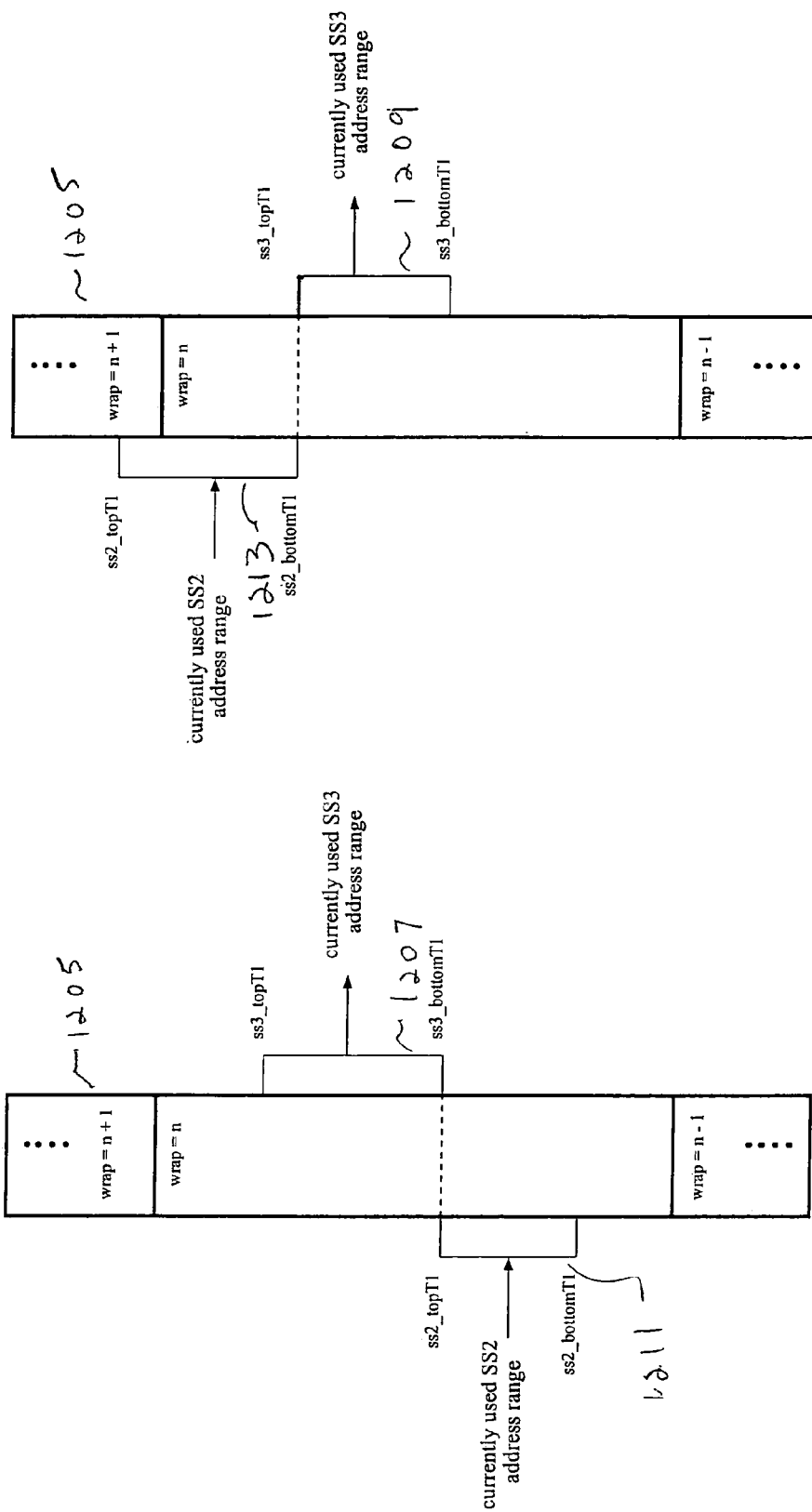
FIG. 12 is a diagram illustrating overflow and underflow conditions for a coherent RAM 1205 in a two-pass, high resolution mode, such as the track mode.

FIG. 12 is a diagram illustrating overflow and underflow conditions for a coherent RAM 1205 in a two-pass, high resolution mode, such as the track mode. In a two-pass mode data is written from ss2_bottom to ss2_top. Then the data in that entire range is reused by returning to the bottom and reprocessing the data from the bottom of the range to the top of the range. It has been stated that the FFT subsystem 215 uses blocks of data, and therefore waits for an entire block to be available before it reads and processes the data. In the two-pass mode, this is also true of the signal processing subsystem 213. In the two-pass mode, the signal processing system 213 is treated as needing access to an entire block or address range at one time. So then overflow occurs in this mode when the top of the region the signal processing subsystem 213 is attempting to access reaches the bottom of the area where the FFT subsystem 215 is trying to read data out. The signal processing subsystem 213 writes into the entire rectangle region 1211. This writing operation is actually an accumulation in which least significant bits (LSBs) are written from the bottom of the range to the top of the range in a first pass, and most significant bits (MSBs) are added from the bottom of the range to the top of the range in a second pass.

The right side of FIG. 12 shows the underflow condition in a two-pass, high resolution mode. A rectangle 1209 defines a currently used FFT subsystem 215 address range in the region labeled wrap=n. A rectangle 1213 defines a currently used signal processing subsystem 213 address range in the region labeled wrap=n. An underflow condition occurs when SS3_topT1 passes (goes above) SS2_bottomT1. That is, and underflow occurs when the FFT subsystem 215 attempts to read out a location above the location that the signal processing subsystem 213 is writing.

Determination of underflow or overflow involves comparing address pointer of the signal processing subsystem 213 and the FFT subsystem 215. Access to the signal processing subsystem 213 and the FFT subsystem 215 is time multiplexed between different channels. When address pointers are compared, it is necessary to know whether a single channel is operating in the signal processing subsystem 213 and the FFT subsystem 215. If both the signal processing subsystem 213 and the FFT subsystem 215 are currently operating in the same channel, "live" address pointers are compared. If both the signal processing subsystem 213 and the FFT subsystem 215 are not concurrently operating in the same channel, stored pointers (from the channel RAM 207) are compared. With reference, for example, to FIG. 11, if the signal processing subsystem 213 and the FFT subsystem 215 are both active in the same coherent buffer region, then live address pointers are used instead of stored address pointers.

In some instances, the coherent RAM 205 and/or the backend storage RAM 109 are shared between multiple channels. This may be viewed as effectively having multiple coherent RAMs and multiple backend storage RAMs. This allows multiple channels to coherently accumulate in the same memory regions consecutively. That is, there are different modes of sharing memory such that, for example, in one mode a coherent RAM is dedicated to a channel for the duration of a context, while in another mode, the coherent RAM is shared between different channels (where a channel is using a particular subsystem during a context). However, if the signal processing subsystem 213 and the FFT subsystem 215 are trying access the same shared coherent RAM, live address pointers are used. The signal processing subsystem 213 knows whether the same coherent RAM region is being used by looking at the base address pointer for the coherent RAM.

Figure 13:
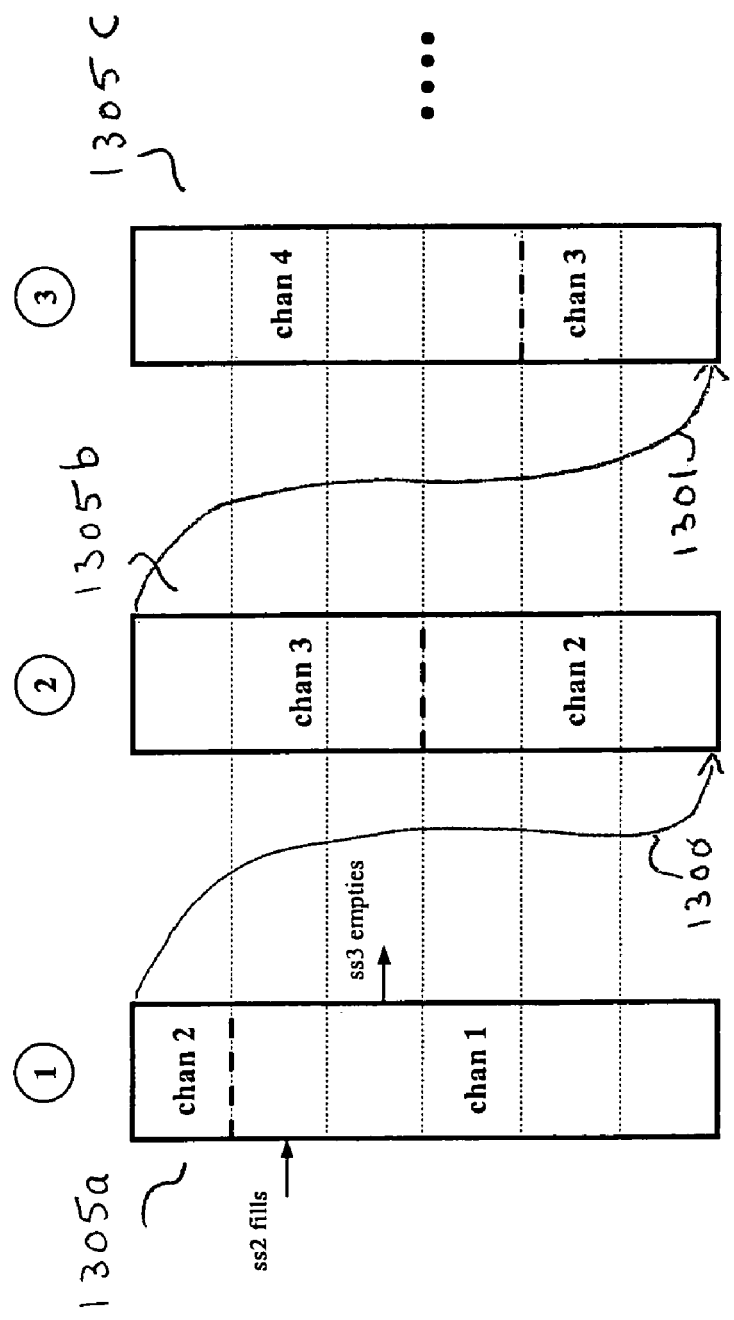
FIG. 13 is a block diagram illustrating an example of a single coherent RAM being shared between multiple channels.

FIG. 13 is a block diagram illustrating an example of a single coherent RAM being shared between multiple channels. This is an advantageous mode of memory usage when a relatively large memory area is allocated for the coherent RAM, but the signal processing system is particularly memory limited. The example of FIG. 13 shows a coherent RAM 1305 in three different time positions, labeled with circled numbers 1–3. Referring first to time position 1, the coherent RAM 1305a is written from the bottom to the top. An area for channel 1 and a partial area for channel 2 are shown. The signal processing subsystem 213 (SS2), as shown by the "ss2 fills" arrow, writes channel 1 data into the channel 1 area. The FFT subsystem 215 (SS3) reads data from the channel 1 area after the signal processing subsystem 213 writes it in. When the signal processing subsystem 213 is finished writing channel 1 data, it moves on to the channel 2 area and begins writing channel 2 data. When the physical coherent RAM area designated by 1305a is filled, the signal processing subsystem moves to the bottom of the coherent RAM area, and begins overwriting. This is shown by the arrow 1300, which shows the path of the signal processing subsystem 213 as it continues to write channel 2 data at the bottom of the coherent RAM 1305b in the time position 2.

In the time position 2, the channel 2 data will be written, and the signal processing subsystem will start writing channel 3 data in the area labeled "channel 3". The channel 3 data does not fit in the remaining coherent RAM area, so in the time position 3 the signal processing subsystem 213 moves to bottom of the coherent RAM area and begins overwriting the previous channel 2 data, as shown by the arrow 1301. As explained previously, if the FFT subsystem 215 catches up to the signal processing subsystem 213 by attempting to read data that the signal processing subsystem 213 has not yet written, the FFT subsystem 215 is stalled, or an underflow error condition occurs.

In one embodiment, some conditions should be met for using a shared coherent RAM mode as illustrated in FIG. 13. For example, the channels sharing the coherent RAM should have the same size T1s, although they may have PDIs of different sizes. The signal processing subsystem 213 should completely write the PDIs of one context before it leaves the context. Each subsystem using the shared coherent RAM should begin with its own stored pointers. In one embodiment, the pointers are stored in a designated region of the coherent RAM itself. Upon exiting the shared coherent RAM, each channel updates it own stored pointers.

In other embodiments, the coherent RAM area may also share a designated physical memory area with a cold start mode backend storage RAM. This is possible because in cold start mode, the backend storage RAM is a "throw-away" RAM in that it is filled, the peaks are determined from the data, and the data is not needed again. In this case, the designated memory area should be used for NCS data after the coherent data has been used, or processed. NCS data is written into the coherent RAM area in this case, but the coherent data pointers are not updated by NCS usage. The designated shared region for coherent data and NCS data should be less than two PDIs worth of data to avoid the possibility of the FFT subsystem processing data outside of its memory area.

Figure 14:
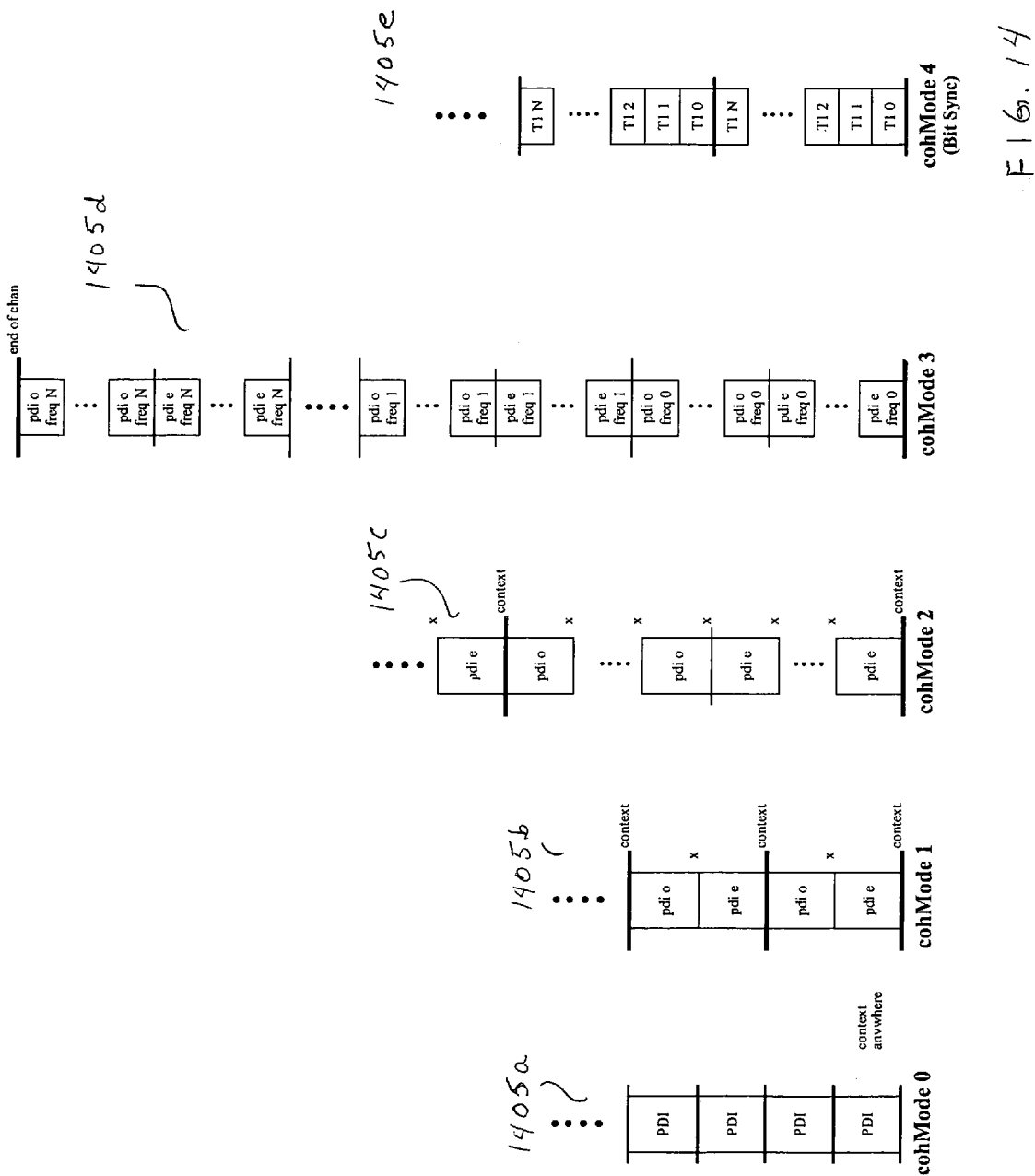
FIG. 14 is a block diagram illustrating various modes of storing data in an allocated coherent data memory area, or coherent RAM.

FIG. 14 is a block diagram illustrating various modes of storing data in an allocated coherent data memory area, or coherent RAM. At the left side of FIG. 14, in a first coherent RAM storage mode zero, a coherent RAM 1405a is written by the signal processing subsystem 213 from bottom to top, one PDI at a time. A context may be completed at any point.

In a coherent storage mode 1, the signal processing subsystem 213 writes a PDI of even half-chips, and then writes a PDI of odd half-chips in a coherent RAM 1405b. The context is then finished, and the storage of data from another context continues with even half chips and then odd half chips. Writing of the coherent RAM 1405b starts at the bottom and continues to the top.

In a coherent storage mode 2, the signal processing subsystem 213 stores multiple PDIs of even half chips alternating with multiple PDIs of odd half chips for one context in a coherent RAM 1405c. The signal processing subsystem then continues storing data in another context from the "context" line. The context lines show where data is stored by the signal processing subsystem 213 during a context in which a particular channel has possession of the signal processing subsystem 213.

In a coherent storage mode 3, the signal processing subsystem 213 stores multiple PDIs of even half-chips for a first frequency (freq 0), then multiple PDIs of odd half-chips for frequency 0 in a coherent RAM 1405d. Then the signal processing subsystem 213 stores multiple PDIs of even half-chips for a next frequency (freq 1), then multiple PDIs of odd half-chips for frequency 1, and so forth.

In a coherent storage mode 4, the signal processing subsystem 213 stores all the coherent data for a T1 0, then all the coherent data for a T1 1, in a coherent RAM 1405e. Storage continues in this fashion until the data for the final T1 is stored. The number of T1s to be stored is predetermined by software. The coherent storage mode 4 is useful in a bit synch mode in which different code offsets are stored in order to facilitate finding a data bit edge in the satellite data stream. Storage for a context may end anywhere.

Figure 15:
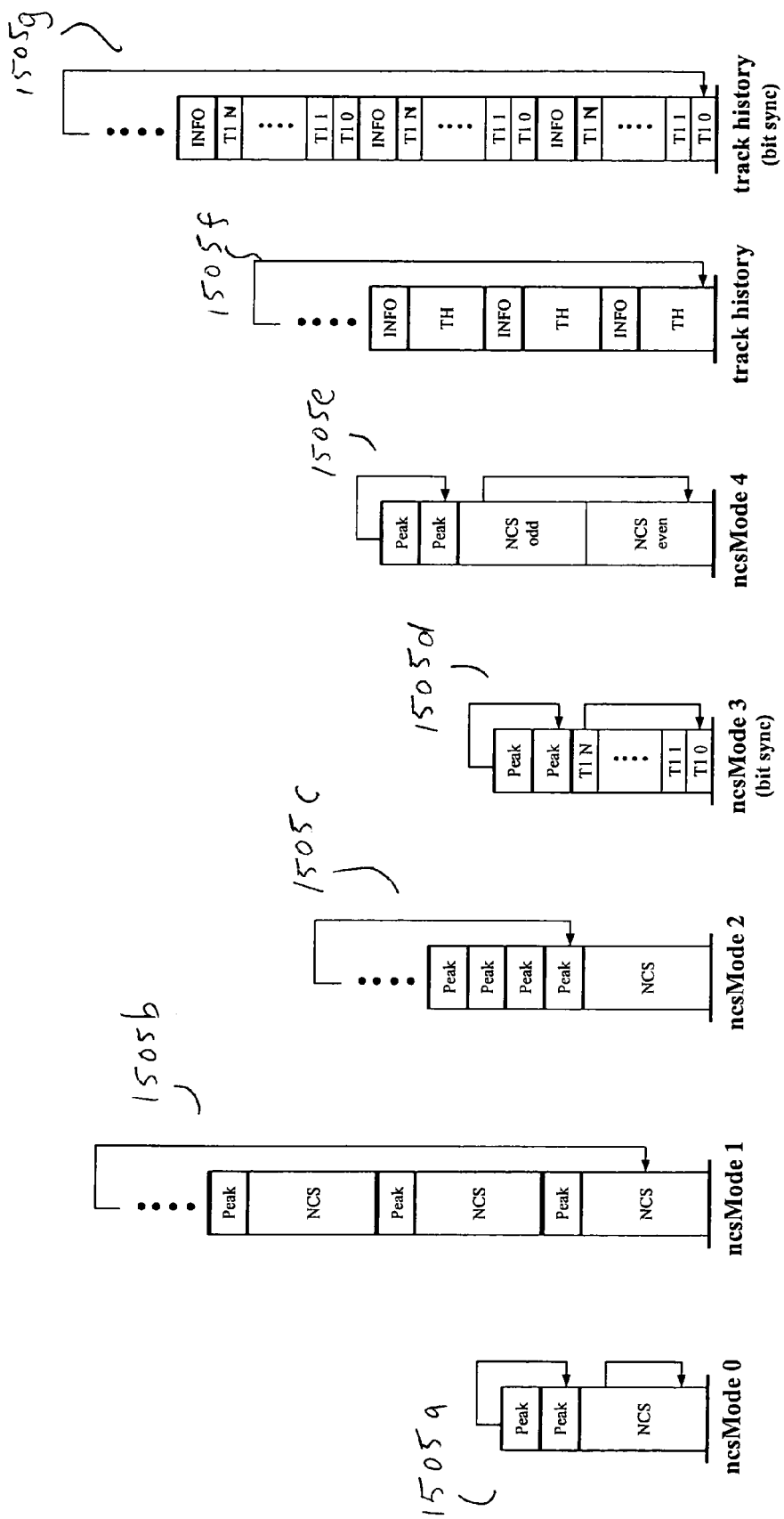
FIG. 15 is a block diagram illustrating various modes of storing data in an allocated NCS data memory area, or backend storage RAM.

FIG. 15 is a block diagram illustrating various modes of storing data in allocated areas of the backend storage RAM. In an NCS mode 0, the FFT subsystem 215 (SS3) stores noncoherent data in an NCS area, and peak data for a particular channel in a peak area as shown. At the end of PDI, the peak data storage moves to a new peak region, as shown. In one embodiment, the backend storage RAM 1505a has two peak locations within the peak area, but can have more than two in other embodiments.

In an NCS mode 1, the FFT subsystem 215 (SS3) stores noncoherent data in NCS areas of a backend storage RAM 1505b, and associated peak data in peak areas of the backend storage RAM 1505b, as shown. The peaks are updated when the NCS data is updated.

In an NCS mode 2, the backend storage RAM 1505c is used as a scratch buffer region. The FIT subsystem 215 (SS3) stores noncoherent data in an NCS area of a backend storage RAM 1505c, and peak data peak areas of the backend storage RAM 1505c, as shown. The peak data is updated at the end of every PDI, but the write pointer is advanced at the end of the NCS data. Because the NCS storage mode 2 is a scratch mode, the NCS data is overwritten, for example, on a half-chip basis, on a frequency basis, etc.

In an NCS mode 3, the FFT subsystem 215 (SS3) stores noncoherent data on a T1 basis in NCS areas of a backend storage RAM 1505d, and peak data in peak areas of the backend storage RAM 1505d, as shown. The peak data is updated at the end of every PDI, including the peak address locations. The arrows indicate the direction in which the write pointer moves when the top of an area has been reached. The NCS mode 3 is useful in a bit synch mode in which different code offsets are stored in order to facilitate finding a data bit edge in the satellite data stream.

In an NCS mode 4, the FFT subsystem 215 (SS3) stores odd and even half chips of noncoherent data in NCS areas of a backend storage RAM 1505e, and peak data in peak areas of the backend storage RAM 1505e, as shown. One odd PDI and one even PDI are stored per context. The peak values are updated after the even and odd PDI data is stored. The peak address locations are updated at the end of every PDI. The arrows indicate the direction in which the write pointer moves when the top of an area has been reached.

As shown, for example in FIG. 2, the track history (TH) data is stored in a TH region of the backend storage RAM 209. The RAM 1505f in FIG. 15 shows one mode of track history storage. Track history (TH) is stored in TH areas, and report information (INFO) is stored in INFO areas, as shown. The TH data is actual coherent data. The INFO data includes report information. Report information includes various reports, such as a TH report that identifies the coherent track history data and indicates the number of PDIs processed, timetags, etc. The bias sum is a continuous sum of bias over all of the PDIs. The noise sum is a continuous sum of noise magnitudes over all of the PDIs. Another report is a context report that is stored at the time of context switch. The context report includes a timetag, a number of PDIs processed, a bias sum, a noise sum, etc.

A RAM 1505g in FIG. 15 shows another mode of track history storage. Track history (TH) is stored in TH areas, and report information (INFO) is stored on a T1 basis in INFO areas, as shown. The TH data is actual coherent data for distinct T1s. The INFO data includes report information. Report information includes various reports, including a TH report that identifies the coherent track history data (e.g., by phase offset and code offset) and indicates the number of PDIs processed, timetags, etc. The bias sum is a continuous sum of bias over all of the PDIs. The noise sum is a continuous sum of noise magnitudes over all of the PDIs. Another report is a context report that is stored at the time of context switch. The context report includes a timetag, a number of PDIs processed, a bias sum, a noise sum, etc. The track history storage mode of the backend storage RAM 1505g is useful in a bit synch mode in which different code offsets are stored in order to facilitate finding a data bit edge in the satellite data stream.

The storage modes of FIGS. 14 and 15 are dictated by the channel parameters, which are store in the channel RAM 207 by the sequencer 217.

Figure 16:
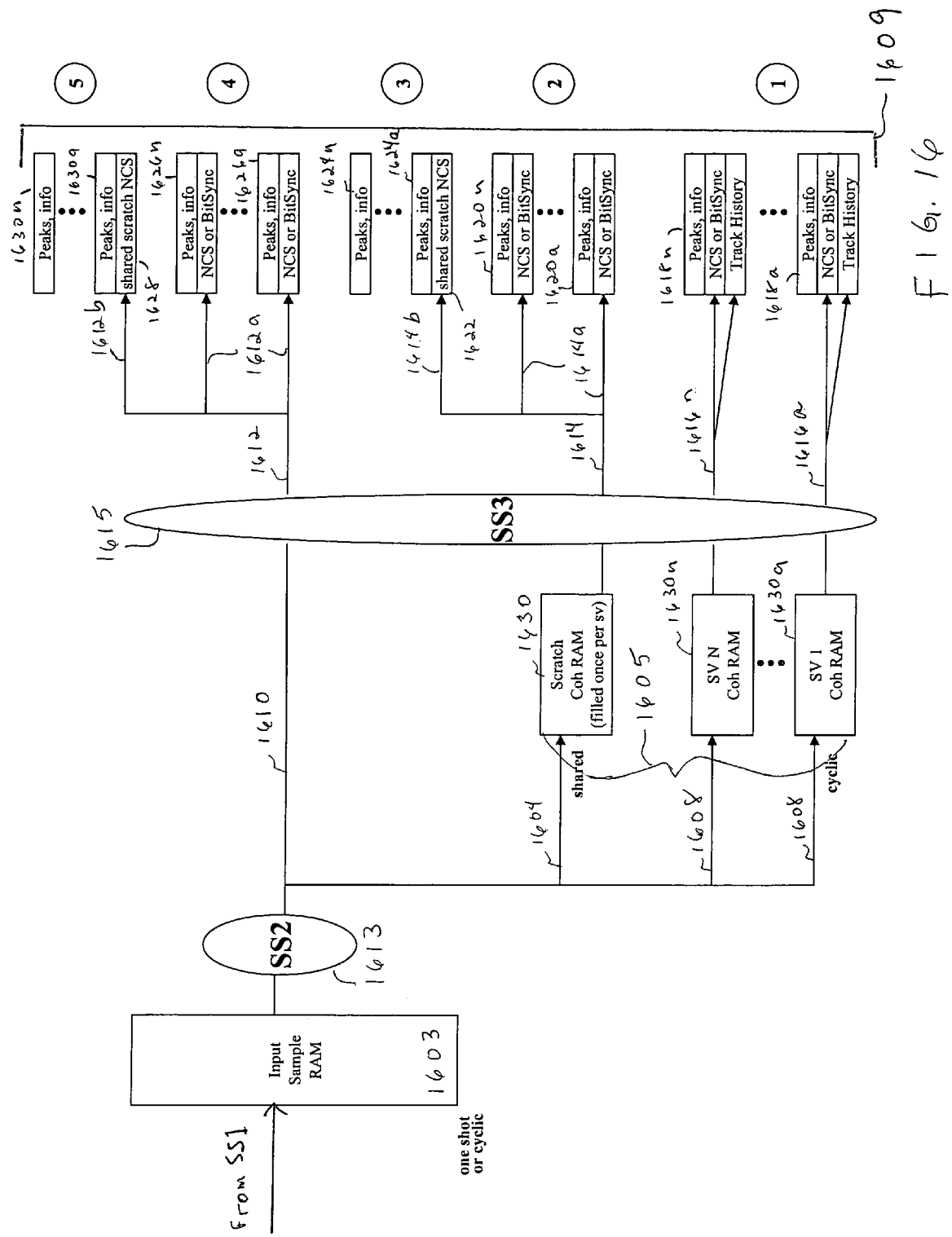
FIG. 16 is a diagram that illustrates the concept of various modes of RAM storage in different operational modes.

FIG. 16 is a diagram that illustrates various modes of RAM storage in different operational modes. On the left of the diagram, an input sample RAM 1603 is filled with input data samples by an input sample subsystem (SS1). The input sample RAM can be filled in a cyclic mode or in a one-shot mode, as previously described. A signal processing subsystem (SS2) 1613 reads data from the input sample RAM 1603, and processes the data. The signal processing subsystem 1613 outputs coherent data on one of several possible data paths 1604, 1608, and 1610, according to the operational mode and configuration of the signal processing system.

Referring again to the output paths of the signal processing subsystem 1613, an output path 1604 represents a path to a shared, scratch area 1630 of the coherent RAM 1605. The scratch area 1630 is filled once per SV. Channels do not maintain their own coherent RAMs, meaning a channel writes the scratch area (overwriting the previous channel's data) and exits each time without regard for its previous location. The physical region of RAM designated for the scratch area 1630 may also be alternated between backend storage RAM (for cold start mode) and coherent scratch RAM (for all other modes).

An output path 1608 represents a path to an SV dedicated coherent data region of the coherent RAM 1605. Coherent data is stored for each SV in a cyclic fashion starting at the bottom with SV1 data in a 1630a region and ending with SVn data in a 1630n region. This would be applicable, for example, when each channel maintained its own coherent RAM; entering the coherent RAM at the same place it previously exited. The SV dedicated region 1630 can also be occasionally used as scratch area.

An output path 1610 represent a path straight to an FFT subsystem 1615 (SS3), bypassing a coherent RAM 1605. This is applicable to the cold start mode. In the cold start mode, the FFT subsystem 1615 processes the coherent data, and sends NCS data to a backend storage RAM 1609 via a path 1612.

Referring now to the area to the right of the FFT subsystem 1615, different configurations of a backend storage RAM 1619 are represented. The circled numbers on the far right of the diagram indicate various types or modes of NCS storage. Storage mode 1 at the bottom of the diagram includes each channel having its own dedicated area of TH and noncoherent data storage. The FFT subsystem 1615 sends data to individual channel areas of the backend storage RAM 1609 via the paths 1616a–1616n. The channel-dedicated backend storage RAM areas 1618a–1618n contain peaks, peak information, NCS data, including bit synch data, and track history data.

Referring to storage mode 2, each NCS region 1620a–1620n, has its own corresponding peak region. The FFT subsystem 1615 sends data to the NCS region 1620 via the path 1614a from the shared, scratch coherent RAM 1630. An alternative NCS storage mode that is also appropriate for the path 1614, is storage mode 3. In the storage mode 3, there is a single scratch region 1622, shared among channels, and several dedicated peak regions 1624a–1624n via a path 1614b.

A storage mode 4 is similar to the storage mode 2 in that it includes multiple NCS regions 1626a–1626n, each with its own corresponding peak region. The FFT subsystem 1615 stored NCS data, including bit synch data, peaks and peak information, in the backend storage RAM region 1626 via a path 1612a. An alternative NCS storage mode that is also appropriate for the path 1612, is storage mode 5. In the storage mode 5, there is a single scratch region 1628, shared among channels, and several dedicated peak regions 1630a–1630n via a path 1612b.

Aspects of the memory allocation and sharing of any of the described embodiments may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the memory allocation and sharing of an embodiment include: microcontrollers with memory (such as electronically erasable programmable read only memory (EEPROM)), embedded microprocessors, firmware, software, etc. Furthermore, aspects of the memory allocation and sharing of an embodiment may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used herein, shall refer to this patent as a whole and not to any particular portions of this patent. When the word "or" is used in reference to a list of two or more items, that word covers all of the following interpretations of the word: any of the items in the list, all of the items in the list and any combination of the items in the list.

The above description of illustrated embodiments of the memory sharing is not intended to be exhaustive or to limit the invention to the precise form disclosed. While specific embodiments of, and examples for, the memory sharing are described herein for illustrative purposes, various equivalent modifications are possible within the scope of the invention, as those skilled in the relevant art will recognize. The teachings of the memory allocation and sharing provided herein can be applied to other electronic systems, not only for the electronic systems described above.

The elements and acts of the various embodiments described above can be combined to provide further embodiments. These and other changes can be made to the memory sharing of an embodiment in light of the above detailed description.

Aspects of the embodiments described herein can be modified, if necessary, to employ the systems, functions and concepts of the various patents and applications described above to provide yet further embodiments of the memory allocation and sharing.

In general, in the following claims, the terms used should not be construed to limit the memory allocation and sharing to the specific embodiments disclosed in the specification and the claims, but should be construed to include all electronic systems that operate under the claims to provide memory allocation and sharing. Accordingly, the memory allocation and sharing is not limited by the disclosure, but instead the scope of the memory sharing is to be determined entirely by the claims.

While certain aspects of the memory allocation and sharing are presented below in certain claim forms, the inventors contemplate the various aspects of the memory allocation and sharing in any number of claim forms. For example, while only one aspect of the memory allocation and sharing is recited as embodied in computer-readable medium, other aspects may likewise be embodied in computer-readable medium. Accordingly, the inventors reserve the right to add additional claims after filing the application to pursue such additional claim forms for other aspects of the memory allocation and sharing.

We claim:

1. An electronic system, comprising:
    a central processing unit (CPU); and
    a signal processing system configurable to process satellite signals in a satellite-based positioning system coupled to the CPU, the signal processing system comprising
    a plurality of subsystems, including an input sample subsystem and at least one other subsystem, wherein the input sample subsystem receives satellite data and produces input data samples, and wherein the at least one other subsystem comprises a signal processing subsystem that produces coherent data, and a fast fourier transform (FFT) subsystem that processes the coherent data and produces noncoherent data;
    a memory device configurable into a plurality of configurations, dependent upon an operational mode of the signal processing system, wherein the memory device is configurable into regions, wherein each region stores a type of data, and each region is accessed by at least one of the plurality of subsystems, and wherein at least one of the regions stores data words from the CPU that determine the configuration of the memory device.

2. The electronic system of claim 1, wherein the regions include an input sample memory that stores the input data samples, a coherent memory that stores the coherent data, and a noncoherent summation (NCS) memory that stores the noncoherent data.

3. The electronic system of claim 2, wherein the plurality of configurations include a cold start configuration, wherein the regions of memory include an input sample memory, and an NCS memory, and wherein:
the input sample memory is of significantly greater size than the NCS memory; and
the input sample memory is filled with input data samples in a one-shot manner such that the signal processing subsystem processes data in the filled input sample memory at least once before the data is overwritten.

4. The electronic system of claim 3, wherein in the cold start configuration, the signal processing system produces coherent data and transmits the coherent data to the FFT subsystem, and wherein the FFT subsystem produces noncoherent data and stores the noncoherent data in the NCS memory.

5. The electronic system of claim 4, wherein in the cold start configuration, the NCS memory is configured to include a scratch region and a peak region, wherein:
the scratch region includes an area for storage of noncoherent data for a satellite concurrently being processed in the cold start mode, and noncoherent data for other satellites not being processed in the cold start mode; and
the peak region includes areas for storage of data peak values for individual satellites.

6. The electronic system of claim 2, wherein the plurality of configurations include a coarse acquisition configuration, wherein the regions of memory include input sample memory, a coherent memory, and a NCS memory, and wherein:
the NCS memory is of significantly greater size than either of the input sample memory and the coherent memory; and
the input sample memory is filled with input data samples in a cyclic manner such that the signal processing subsystem reads out data to be processed from one area of the input sample memory while the input simple subsystem writes data into the input sample memory.

7. The electronic system of claim 6, wherein in time coarse acquisition configuration, the signal processing subsystem produces coherent data and stores the coherent data in the coherent memory while the FFT subsystem reads coherent data out of the coherent memory.

8. The electronic system of claim 7, wherein the coarse acquisition configuration, the FFT subsystem produces noncoherent data and stores the noncoherent data in the NCS memory.

9. The electronic system of claim 8, wherein in the coarse acquisition configuration, the NCS memory is configured to include an NCS and a peak region, wherein:
the NCS region includes areas for storage of noncoherent data for individual satellites; and
the peak region includes areas for storage of data peak values for individual satellites.

10. The electronic system of claim 2, wherein the plurality of configurations include a hot start configuration, wherein the regions of memory include an input sample memory, a coherent memory, and an NCS memory, and wherein:
the NCS memory is of significantly greater size than either of the input sample memory and the coherent memory;
the input sample memory is filled with input data samples in a cyclic manner such that the signal processing subsystem reads out data to be processed from one area of the input sample memory while the input sample subsystem writes data into the input sample memory; and
the signal processing subsystem produces coherent data and stores the coherent data in the coherent memory, wherein the coherent memory is configured to include a scratch area and a plurality of coherent areas, each for storage of coherent data from a satellite.

11. The electronic system of claim 10, wherein in the hot start configuration, the signal processing subsystem writes coherent data into the coherent memory while FFT subsystem reads coherent data out of the coherent memory.

12. The electronic system of claim 11, wherein the hot start configuration, the FFT subsystem produces noncoherent data and stores the noncoherent data in the NCS memory.

13. The electronic system of claim 12, wherein in the hot start configuration, the NCS memory is configured to include an NCS region and a peak region, wherein:
the NCS region includes areas for storage of noncoherent data for individual satellites; and the peak region includes areas for storage of data peak values for individual satellites.

14. The electronic system of claim 2, wherein the plurality of configurations include a tracking configuration, wherein the regions of memory include an input sample memory, a coherent memory, and an NCS memory, and wherein:
the NCS memory is of significantly greater size than either of the input sample memory and the coherent memory;
the input sample memory is filled with input data samples in a cyclic manner such that the signal processing subsystem reads out data to be processed from one area of the input sample memory while the input sample subsystem writes data into the input sample memory;
the signal processing subsystem produces coherent data and stores the coherent data in the coherent memory, wherein the coherent memory is configured to include a scratch area and a plurality of coherent areas, each for storage of coherent data from a satellite; and
the FFT subsystem reads coherent data out of the coherent memory, and produces noncoherent data and stores the noncoherent data in the NCS memory wherein the NCS memory is configured to include an NCS region and a peak region and a track region, and wherein,
the NCS region includes areas for storage of noncoherent data for individual
the peak region includes areas for storage of data peak values for individual satellites; and
the track history region includes areas for storage of track history data, including coherent data, for individual satellites.

15. A method for multi-channel signal processing, comprising:
continuously receiving a plurality of discrete signals;
processing the plurality of discrete signals in a signal processing component on time-multiplexed basis including,
configuring the signal processing component for one of a plurality of operational modes, including allocating a memory into areas for storage of types of data, wherein certain areas are accessed by certain signal processing subsystems, wherein configuring includes configuring the signal processing component to operate in different modes concurrently for different discrete signals; and
continuously configuring the signal processing component based on evaluation of output of the signal processing component, wherein reconfiguring includes configuring the signal processing component to operate in different modes concurrently for different discrete signals.

16. The method of claim 15, wherein the discrete signals comprise global positioning system (GPS) satellite signals, and wherein the operational modes include:
   modes in which a wide, low, resolution search for GPS satellites is performed
   modes in which a narrow, high resolution search for GPS satellites is performed; and
   modes in which previously acquired GPS satellites are tracked, wherein configuring the signal processing system comprises configuring the memory to be used concurrently to process the plurality of discrete signals in different operational modes.

17. The method of claim 16, wherein configuring the signal processing system further comprises storing data words in a discrete signals region of the memory, wherein the data words includes:
   information for configuring the signal processing system for a discrete signal; and
   status information for a discrete signal bring processed, including pointers to locations in the allocated means for storage of different types of data.

18. The method of claim 17, wherein configuring the signal processing system further comprises receiving the data words from software, wherein the software evaluates an output of the signal processing system and continuously updates the data words according to the evaluation.

19. The method of claim 18, wherein the allocated areas for storage include:
   an input sample area for storing input data samples from GPS satellites;
   coherent data areas for storing coherent data produced by a subsystem; and
   noncoherent data (NCS) areas for storing noncoherent data produced by another subsystem, wherein the NCS area is further used for storing report data and history data that is evaluated by the software.

20. The method of claim 19, wherein configuring the signal processing system further comprises designating different modes of storing data in the allocated areas of the 3 memory, wherein the different modes of storage include a circular buffer mode and a one-shot mode.

21. The method of claim 15, wherein processing the plurality of discrete signals in a signal processing component on a time-multiplexed basis further comprises:
   determining an underflow condition and an underflow condition when more than one subsystem processes an allocated mean of memory;
   in response to determination of an under flow is waiting to read data from the allocated area of memory, and sending an error rod matron to the software; and in response to determination of an overflow condition processing invalid data until valid data is available, and sending an error indication to the software.

22. The method of claim 19, wherein allocating the memory in the modes in which a wide low-resolution search for GPS satellites is performed includes allocating a significant majority of the memory to the input sample area for storing input dam samples 4 from GPS satellites in a one-shot mode.

23. The method of claim 19, wherein allocating the memory in the modes which a narrow high resolution search for GPS satellites is performed includes allocating a significant majority of the memory to the NCS area.

24. The method of claim 19, wherein allocating the memory in the modes which previously acquired-GPS satellites are tracked includes allocating a significant majority of the memory to the NCS area.

25. The method of claim 23, wherein the NCS area is fresher allocated to include an NCS region and a peak region, wherein: the NCS region includes means for storage of noncoherent data for individual GPS satellites; and the peak region includes areas for storage of data peak values for individual GPS Satellites.

26. The method of claim 24, wherein the NCS area is further allocated to include an NCS region and a peak region, mad a track region, and wherein,
   the NCS region includes areas for storage of noncoherent data for individual satellites;
   the peak region includes areas for storage of data peak values for individual satellites; and
   the track history region includes areas for storage of track history data, including coherent data, for individual satellites.

27. An electronic system comprising:
   a processing means,
   a signal processing system configurable to process satellite signals in a satellite based positioning system coupled to the processing means, the signal processing system comprising,
   a plurality of signal processing means, including an input sample means and at least one other signal processing means wherein the input sample means receives satellite data and produces input data samples, and wherein the at least one other signal processing means comprises a first signal processing means that produces coherent data, and a second signal processing means that processes the coherent data and produces noncoherent data;
   a memory device configurable into a plurality of configurations, dependent upon an operational mode of the signal processing system, wherein the memory device is configurable into regions, wherein each region stores a type of data, and each region is accessed by particular signal processing means, and wherein at least one of the regions stores data words from the processing means that determine the configuration of the memory device.

28. The electronic system of claim 27, wherein the regions include an input sample memory that stores the input data samples, a. coherent memory that stores the coherent data, and a noncoherent summation (NCS) memory that stores the noncoherent data.

29. The electronic system of claim 28, wherein the plurality of configurations include a cold start configuration, wherein the regions of memory include an input sample memory and a NCS memory and wherein:
   the input sample memory is of significantly greater size than the NCS memory;
   the input sample memory is filled with input data samples in a one-shot manner such that the signal processing subsystem processes data in the filled input sample memory at least once before the data is overwritten.

30. The electronic system of claim 29, wherein in the cold start configuration, the first signal processing means produces coherent data and transmits the coherent data to the second signal processing means, and wherein the second signal processing means produces noncoherent data and stores the noncoherent data in the NCS memory.

31. The electronic system of claim 30 wherein in the cold start configuration, the NCS memory is configured to include a scratch region and a peak region, wherein:
   the scratch region includes an area for storage of noncoherent data for a satellite currently being processed in the cold start mode, and noncoherent data for other satellites not being processed in the cold start mode; and the peak region includes areas for storage of data peak values for individual satellites.

32. The electronic system of claim 31, wherein the plurality of configurations include a coarse acquisition configuration, wherein the regions of memory include an input sample memory, a coherent memory, and an NCS memory, and wherein:
the NCS memory is of significantly greater size than either of the input sample memory and the coherent memory; and
the input sample memory is filled with input data samples in a cyclic manner such that the signal processing subsystem reads out data to be processed from one area of the input sample memory, while the input sample subsystem writes data into the input sample memory.

33. The electronic system of claim 32, wherein in the coarse acquisition configuration, the first signal processing means produces coherent data and stores the coherent data in the coherent memory while the second signal processing means reads coherent data out of the coherent memory.

34. The electronic system of claim 33 wherein the coarse configuration, the second signal processing means produces noncoherent data and stores the noncoherent data in the NCS memory.

35. The electronic system of claim 34, wherein in the coarse acquisition configuration, the NCS memory is configured to include an NCS region and a peak region, wherein:
the NCS region includes areas for storage of noncoherent data for individual satellites; and
the peak region includes areas for storage of data peak values for individual satellites.

36. The electronic system of claim 28, wherein the plurality of configurations include a hot start configuration, wherein the regions of memory include an input sample memory, a coherent memory, and an NCS memory, and wherein:
the NCS memory is of significantly greater size than either of the input sample memory and the coherent memory;
the input sample memory is filled with input data samples in a cyclic manner such that the first signal processing means reads out data to be processed from one area of the input sample memory while the input sample subsystem writes data into the input sample memory; and
the first signal processing means produces coherent data and stores the data in the coherent memory, wherein the coherent memory is configured to include a scratch area, and a plurality of coherent areas, each for storage of coherent data from a satellite.

37. The electronic system of claim 36, wherein in the hot start configuration, the first signal processing means writes coherent data into the coherent memory while the second signal processing means reads coherent data out of the coherent memory.

38. The electronic system of claim 37, wherein the hot start configurations, the second signal processing means produces noncoherent data and stores the noncoherent data in the NCS memory.

39. The electronic system of claim 38, wherein the NC8 memory is configured to include an NCS region and a peak region, wherein:
the NCS region includes areas for storage of noncoherent data for individual satellites; and
the peak region includes areas for storage of data peak values for individual satellites.

40. The electronic system of claim 28, wherein the plurality of configurations include a tracking configuration wherein the regions of memory include an input sample memory, a coherent memory and an NCS memory, and wherein:
the NCS memory is of significantly greater size than either of the input sample memory and the coherent memory;
the input sample memory is filled with input data samples in a cyclic manner such that the first signal processing means reads out data to be processed from one area of the input sample memory while the input sample means writes data into the input sample memory;
the first signal processing means produces coherent data and stores the coherent data in the coherent memory, wherein the coherent memory is configured to include a scratch area and a plurality of coherent areas, each for storage of coherent data from a satellite; and
the second signal processing means reads coherent data out of the coherent memory, and produces noncoherent data and stores the noncoherent data in the NCS memory, wherein the NCS memory is configured to include an NCS region and a peak region, and a track region, and wherein,
the NCS region includes areas for storage of noncoherent data for individual satellites;
the peak region includes areas for storage of data peak values for individual satellites; and
the track history region includes areas for storage of track history data including coherent data, for individual satellites.

41. A machine readable medium having instructions stored thereon, which when executed, cause a signal processing method to be performed the method comprising;
continuously receiving multiple channels, wherein each channel comprises a discrete signal; processing the multiple channels in a signal processing component on a time-multiplexed basis, including,
configuring the signal processing component for one of a plurality of operational modes, including allocating a memory into areas for storage of types of data, wherein certain areas are accessed by certain signal processing subsystems, wherein configuring includes configuring the signal processing component to operate in different modes concurrently for different channels; and
continuously reconfiguring the signal processing component based on evaluation of output of the signal processing component, wherein reconfiguring includes configuring the signal processing component to operate in different modes concurrently for different channels.

42. The machine readable medium of claim 41, wherein the discrete signals comprise global, positioning system (GPS) satellite signals, and wherein the operational modes include:
modes in which a wide, low-resolution search for GPS satellites is performed modes in which a narrow, high resolution search for GPS satellites is performed; and modes in which previously acquired GPS satellites are tracked, wherein configuring the signal processing system comprises configuring the memory to be used concurrently to process multiple channels in different operational modes.

43. The machine readable medium of claim 42, wherein configuring the signal processing system further comprises storing data words in a channel region of the memory, wherein the data words include:
information for configuring the signal processing system for a channel; and
status information for a channel being processed including pointers to locations in the allocated areas for storage of different types of data.

44. The machine readable medium of claim 43, wherein configuring the signal processing system fresher comprises receiving the data words from software, wherein the software evaluates an output of the signal processing system and continuously updates the data words according to the evaluation.

45. The machine readable medium of claim 44, wherein the allocated areas for storage include:
- an input sample area for storing input data samples from GPS satellites;
- a coherent data areas for storing coherent data produced by a subsystem; and
- a noncoherent data (NCS) areas for storing noncoherent data produced by another subsystem, wherein the NCS area if further for storing report data and history data that is evaluated by the software.

46. The machine readable medium of claim 45, wherein configuring the signal processing system further comprises designating different modes of storing data in the allocated areas of the memory, wherein the different modes of storage include a circular buffer mode and a one-shot mode.

47. The machine readable medium of claim 41, wherein processing the multiple channels in a signal processing component on a time multiplexed basis further comprises:
- determining an underflow condition and an underflow condition when more than one subsystem accesses an allocated area of memory;
- in response to determination of an underflow condition, stalling a subsystem that is waiting to read data from the allocated area of memory, and sending an error indication to the software; and
- in response to determination of an overflow condition, processing invalid data until valid data is available, and sending an error indication to the software.

48. The machine readable medium of claim 45, wherein allocating the memory in the modes in which a. wide, low-resolution search for GPS satellites is performed includes allocating a significant majority of the memory to the input sample area for storing input data samples from GPS satellites in a one-shot mode.

49. The machine readable medium of claim 45, wherein allocating the memory in the modes in which a narrow high resolution search for GPS satellites is performed includes allocating a significant major of the memory to the NCS area.

50. The machine readable medium of claim 45, wherein allocating the memory, in the modes in which previously acquired GPS satellites are tracked includes allocating a significant majority of the memory to the NCS area.

51. The machine readable medium of claim 49, wherein the NCS area is further allocated to include an NCS region and a peak region, wherein:
- the NCS region includes areas for storage of noncoherent data for individual GPS satellites; and
- the peak region includes areas for storage of data peak values for individual GPS satellites.

52. The machine readable medium of claim 50, wherein, the NCS area, is farther allocated, to include an NCS region and a peak region, and a track region and wherein,
- the NCS region includes areas for storage of noncoherent data for individual satellites;
- the peak region includes areas for storage of data peak values for individual satellites; and
- the track history region includes areas for storage of track history data, including coherent data, for individual satellites.

* * * * *